United States Patent [19]

Clark

[11] Patent Number: 5,409,610

[45] Date of Patent: Apr. 25, 1995

[54] METHOD FOR ANAEROBIC SLUDGE DIGESTION

[76] Inventor: Sidney E. Clark, 305 Blue Ridge Pkwy., Madison, Wis. 53705

[21] Appl. No.: 970,548

[22] Filed: Nov. 2, 1992

Related U.S. Application Data

[63] Continuation of Ser. No. 668,953, Mar. 13, 1991, abandoned.

[51] Int. Cl.$^6$ .............................................. C02F 11/04
[52] U.S. Cl. .................... 210/603; 210/613; 210/179; 210/180
[58] Field of Search ............. 210/603, 613, 629, 630, 210/179, 180, 194, 196, 197, 512.1

[56] References Cited

U.S. PATENT DOCUMENTS

| | | | |
|---|---|---|---|
| 1,722,945 | 7/1929 | Prüss | 210/2 |
| 2,043,119 | 6/1936 | Prüss | 210/2 |
| 2,605,220 | 7/1952 | Logan | 210/2 |
| 2,680,602 | 6/1954 | Nelson et al. | 259/97 |
| 3,055,502 | 9/1962 | Cunetta | 210/197 |
| 3,194,756 | 7/1965 | Walker | 210/197 |
| 3,338,826 | 8/1967 | Kramer | 210/613 |
| 3,371,618 | 3/1968 | Chambers | 103/258 |
| 3,373,688 | 3/1968 | Howard | 103/3 |
| 3,400,047 | 9/1968 | Howard | 176/56 |
| 3,625,820 | 12/1971 | Gluntz | 176/54 |
| 4,092,338 | 5/1978 | Tossey | 210/603 |
| 4,111,808 | 9/1978 | Fair | 210/197 |
| 4,207,180 | 6/1980 | Chang | 210/180 |
| 4,482,458 | 11/1984 | Rovel et al. | 210/603 |
| 4,586,825 | 5/1986 | Hayatdavoudi | 366/137 |
| 4,847,043 | 7/1989 | Gluntz | 376/372 |
| 4,879,087 | 11/1989 | Akiyama et al. | 376/216 |
| 4,954,257 | 9/1990 | Vogelpohl et al. | 210/629 |
| 4,981,366 | 1/1991 | Wickoren | 210/197 |

OTHER PUBLICATIONS

"Entrainment In Turbulent Fluid Jets" Donald and Singer; Trans. Instn. Chem. Engrs., vol. 37, 1959.

Egg–Shaped Digesters; From Germany to the United States, J. R. Stukenberg et al; 63rd Annual Conference Water Pollution Control Federation, Washington, D.C., Oct. 7–11, 1990.

Mixing in Egg–Shaped Anaerobic Digesters, J. P. Garvin and R. E. Hills.

*Primary Examiner*—Thomas Wyse
*Attorney, Agent, or Firm*—Marshall, O'Toole, Gerstein, Murray & Borun

[57] ABSTRACT

Method and apparatus for anaerobically digesting sludge by filling an anaerobic sludge digestion vessel having a top and bottom and a substantially vertical draft tube with an upper end spaced downward of the vessel top and a lower end spaced upward of the vessel bottom, with liquid sludge to a level substantially above the draft tube upper end; feeding a pressurized stream of liquid sludge to the inlet side of an upwardly directed jet nozzle operatively positioned and in communication with a substantially vertical venturi tube having a lower inlet and forming part of the draft tube lower end to a lower pressure thereby creating suction at the venturi tube inlet and producing a pumping action which causes a stream of liquid sludge in the vessel bottom space to flow into and upwardly in and out of the draft tube upper end and to thoroughly admix and disperse with the pressurized sludge stream supplied to the jet nozzle and also causing downward circulating flow of liquid sludge in the vessel. Additional sludge mixing can be achieved by placing a similar jet nozzle and venturi tube at the top of the vessel to produce a downward mixing flow of sludge in the draft tube. Also, such a jet pump can be mounted substantially tangentially of the vessel wall to produce helical mixing of the sludge in the vessel. The driving liquid fed to the jet nozzle can be partially digested sludge withdrawn from the vessel, raw sludge or a mixture thereof.

33 Claims, 10 Drawing Sheets

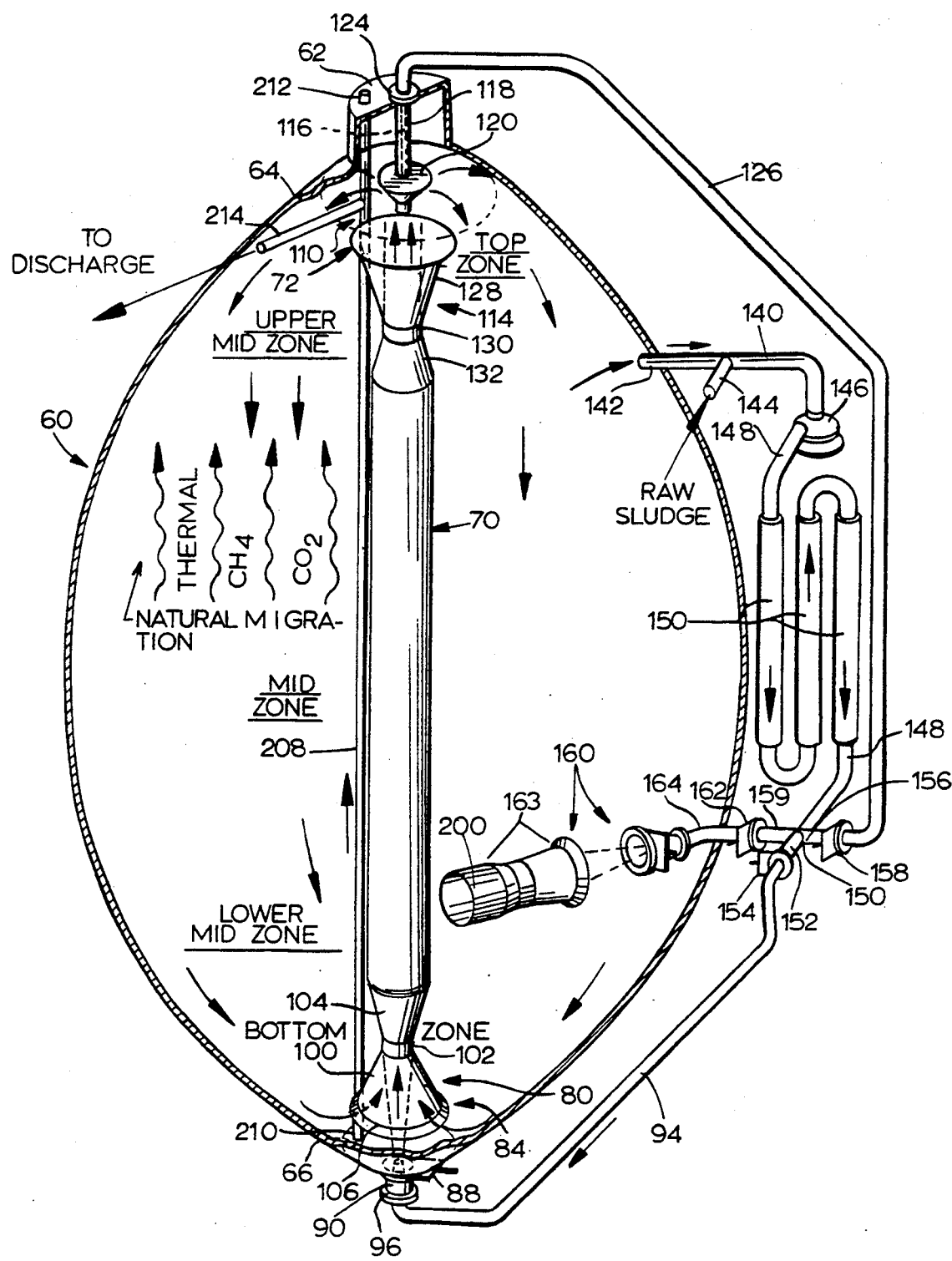

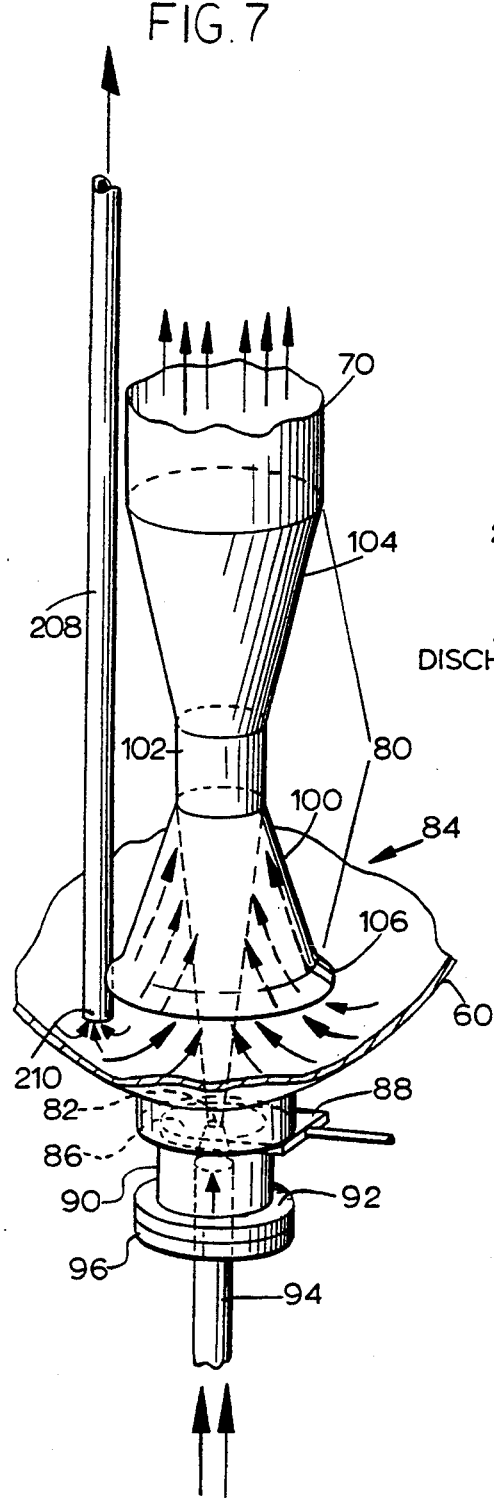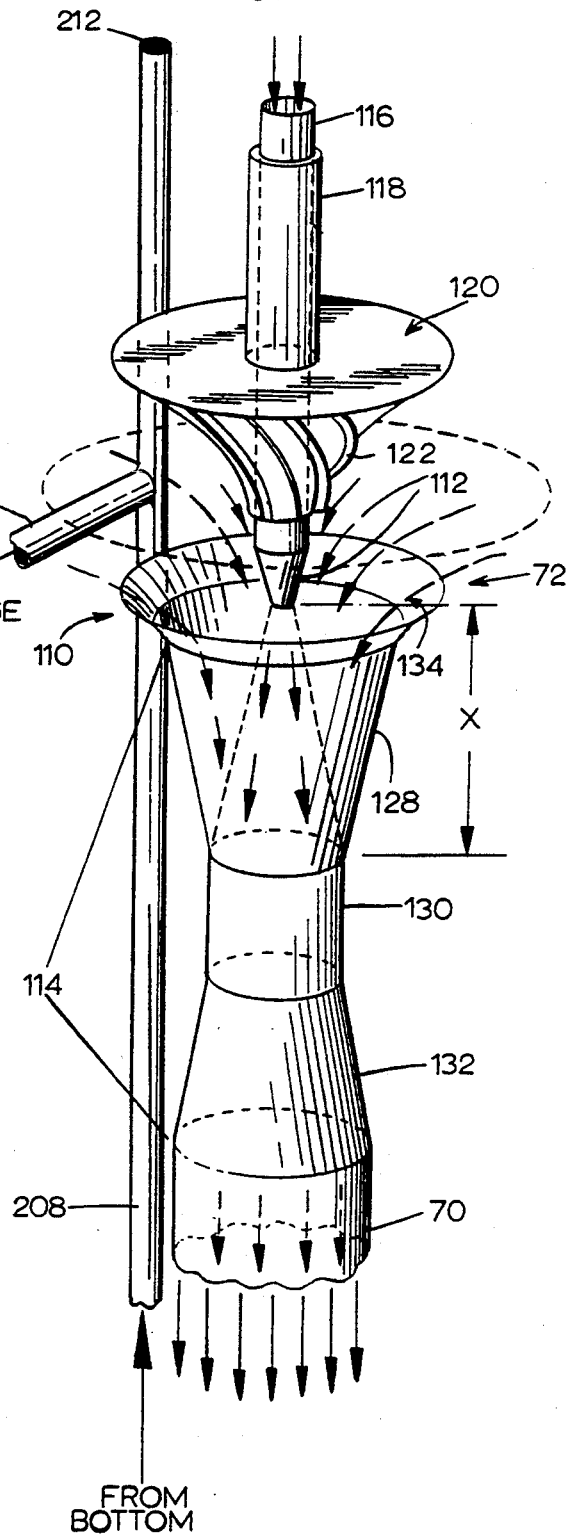

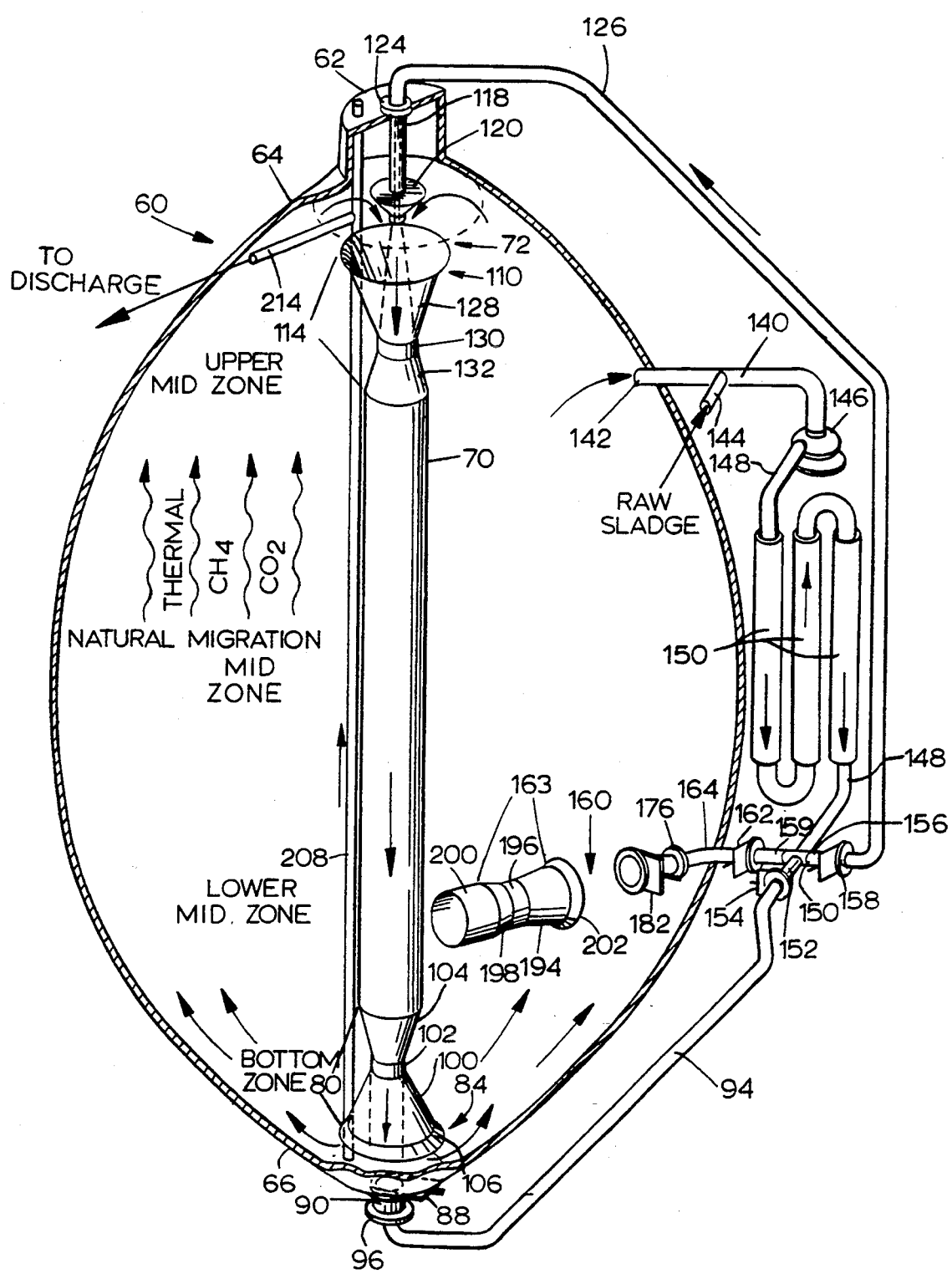

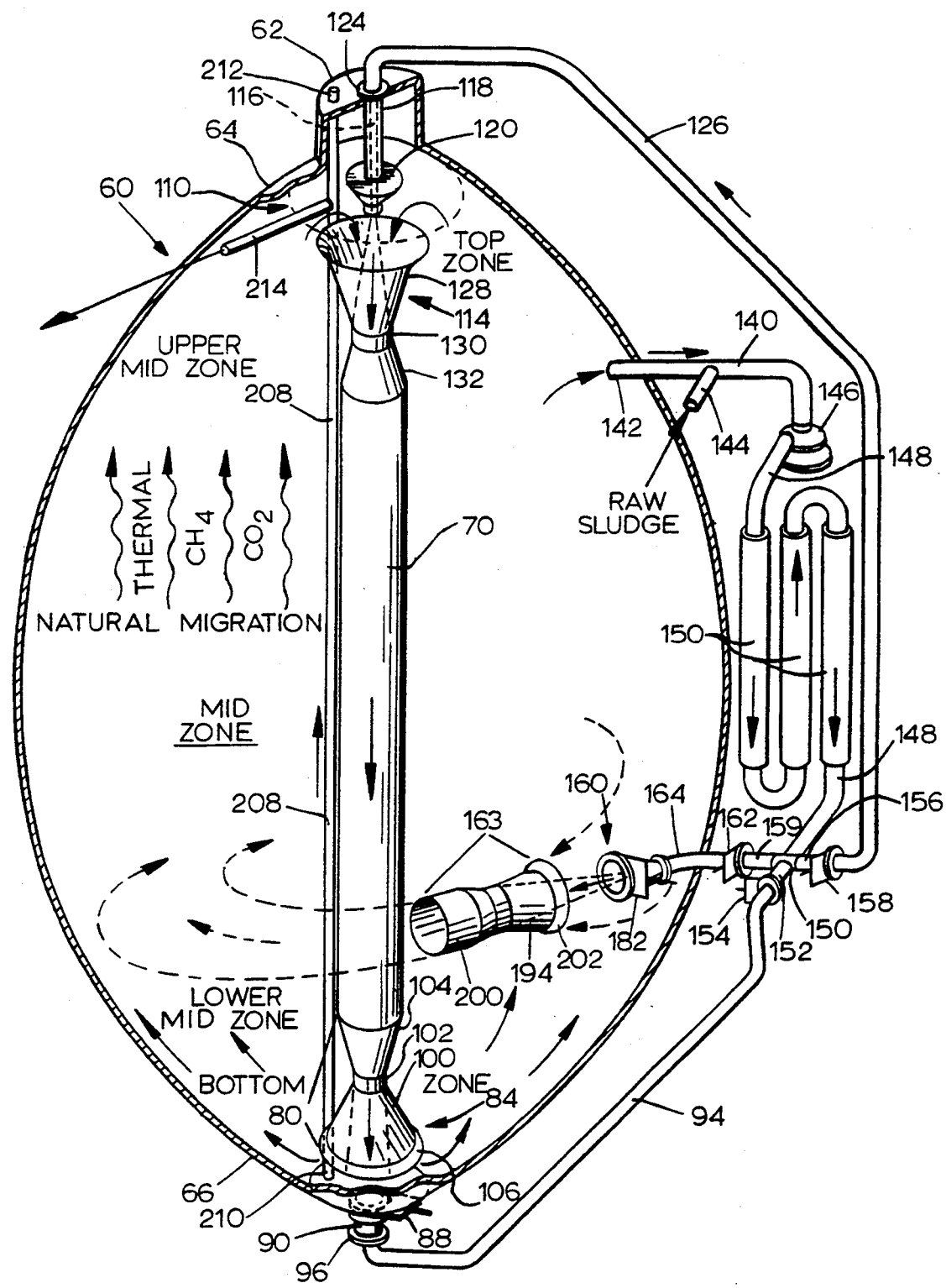

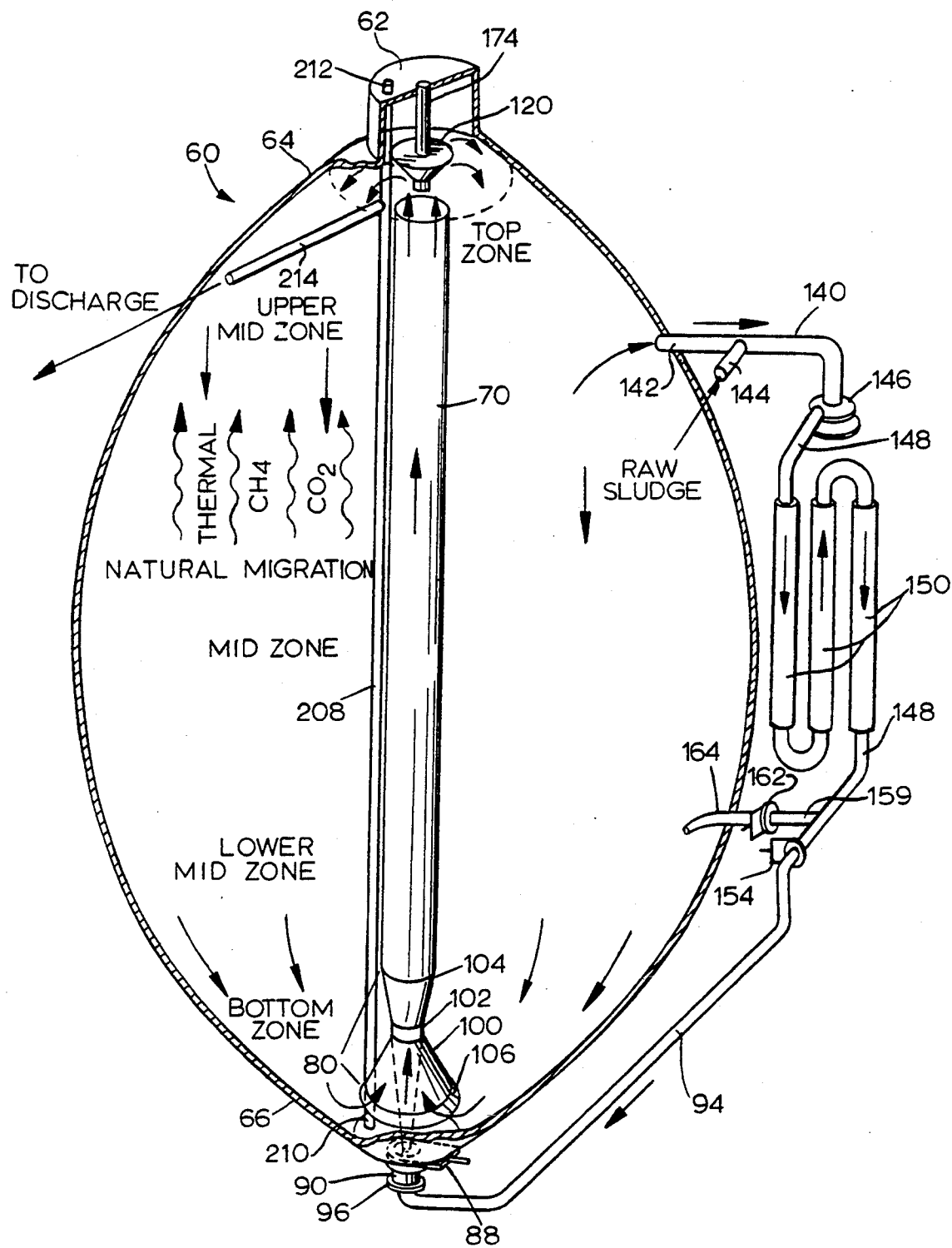

METHOD FOR ANAEROBIC SLUDGE DIGESTION

This application is a continuation of application Ser. No. 07/668,953, filed Mar. 13, 1991, now abandoned.

This invention relates to methods and apparatus for anaerobic digestion of sludge. More particularly, this invention provides improved methods and apparatus for anaerobic digestion of sludge by enhanced mixing and circulation of the sludge using one or more liquid jet stream driven venturi tube jet pumps.

BACKGROUND OF THE INVENTION

Historically anaerobic sludge digestion has been used for stabilization of primary clarifier sludges. More recently, it has been applied to biological sludges produced by the activated sludge or trickling filter processes, and sludge mixtures containing significant industrial waste contributions.

Anaerobic digestion involves a complex microbiological community in which various groups of organisms carry out initial, intermediate and final stabilization steps. The groups of organisms work together in a symbiotic relationship. Not only is a constant temperature important but the food supply should be available on a steady state basis. This requires that the mass be mixed on a steady state basis.

Mixing is more than moving masses of material around relative to the containment vessel in which the anaerobic digestion takes place. Mixing must provide differential displacement of masses relative to each other. As the displaced units of mass become smaller, mixing becomes more effective. Ideal process kinetics and rates of reaction can only be approached when the food for each bacterium is evenly distributed throughout the digesting mass. The end products of the hydrolyzing bacteria become the food for the organic acid producing bacteria. The end products of one group of anaerobic bacteria become the food for the next group in the overall sequence. It continues all the way to the final steps that produce stable end products and gas, largely methane.

In the United States the containment vessel usually had a nearly flat bottom cylindrical side wall and a slightly domed roof because this shape was least expensive to build. The vessel shape has not been considered an important or critical factor by American engineers. Instead of relating digester mixing problems to both vessel shape and the mixing devices, American engineers and process specialists have concentrated on the mixing devices.

Early American mixing systems concentrated on the use of gas injection to induce mixing. The naturally occurring digester gas was compressed mechanically and injected into the bottom zone of the digester with bottom supported diffusers or roof supported gas diffuser lances. Such gas compression systems are complex and create maintenance problems. Process performance is erratic and unpredictable. As scientific investigation continued, systems using draft tube pumps became the mixing systems of choice. Most of the draft tube pumps utilized compressed gas injected into the draft tube interior near the bottom. Some manufacturers utilized propeller pumps located near the top of the draft tube to provide the pumping action. The American draft tube mixing systems have concentrated on large volume displacement of digesting sludge from the bottom of the digester to the top.

While the fundamental anaerobic digestion principles are sound, several problems continue to cause erratic and unpredictable anaerobic digester behavior in America. The large diameter-to-depth ratio tanks with nearly flat bottoms common in America makes them difficult to keep completely mixed. In the last 15 years, the amount of mixing energy utilized has increased substantially. With increased mixing overall digester performance has improved but still is erratic and unpredictable.

The gas induced mixing systems have special problems. The gas mixing systems encourage foam and lighter than water materials to accumulate at the surface. As the surface foam layer increases it begins to develop some strength because of drying caused by the migrating gas. As these surface layers increase in depth, they reduce the active volume of the digester. The reduced volume contributes to the eventual overload and failure of the process.

Some manufacturers use propeller pumps to institute mass pumpage from the digester vessel bottom to the top. The propeller pump avoids some of the gas lift pump problems but has its own problems. The propeller pumps have low energy efficiency. The propellers and shafts are subjected to a severe environment. The sludge has high corrosion and erosion potential. Stringy materials can collect on the blades and unbalance the system causing mechanical failures.

In summary the large mass displacement mixing systems used in conventional American digesters do not create optimum mixing conditions.

In Europe, particularly Germany, more importance has been associated with true and effective mixing in anaerobic digesters. German digesters generally have a different vessel shape. While the vessel shapes vary some, the basic conditions stay the same. All of the vessels have a steep-sided bottom cone with a barrel, sphere or cylinder middle zone and an inverted cone on top. This basic shape, including its elliptical variations, makes it easier to prevent solids from settling or floating out of the main active mass. The German process performance is quite stable and consistent.

Most of the German facilities use pumped liquid circulation for mixing. The smaller facilities have systems that rely on selective displacement to move mass from various digester locations and reinject it to create circulation. These pumped circulation systems have a low energy efficiency. The larger facilities combine a central draft tube pump with externally pumped circulation to provide mass movement. The vertical mass movement of mixing together, coupled with the natural forces of thermal and gas upward migration, work to provide interference mixing. The draft tube pumps are activated by a propeller pump at the draft tube top. Through very conservative design, the propeller pumps are mechanically reliable. However, the propeller pumps are extremely expensive and are not particularly energy efficient. The German vessel shape allows the mixing pumpage rate to be considerably less than necessary with American systems. The energy required by German digester systems is substantially less.

From the above discussion it is clear that new apparatus and methods are needed which will achieve increased mixing of the liquid volume in an anaerobic digester, desirably with reduced energy consumption and which involves equipment which is relatively simple to construct and operate and which is resistant to the harsh conditions present in such a digester.

SUMMARY OF THE INVENTION

According to one aspect of the invention a method of anaerobically digesting sludge is provided which comprises filling an anaerobic sludge digestion vessel, which has a top and bottom and a substantially vertical draft tube with an upper end spaced downward of the vessel top and a lower end spaced upward of the vessel bottom, with liquid sludge to a level near the draft tube upper end; maintaining the vessel liquid sludge content at a temperature which is highly conducive to digestion of the sludge by anaerobic microorganisms; and feeding a pressurized stream of liquid sludge through a first conduit to the inlet side of an upwardly directed jet pump nozzle operatively positioned and in communication with a vertical venturi tube having a lower inlet means and forming part of the draft tube lower end to a lower pressure thereby creating a suction at the venturi tube inlet means and producing a pumping action which causes a stream of liquid sludge in the vessel bottom space to flow into and upwardly in and out of the draft tube upper end and to thoroughly admix and disperse with the pressurized sludge stream supplied to the jet nozzle and also causing downward circulating flow of liquid sludge in the vessel.

The jet pump used in the method employs a high velocity jet of liquid sludge traveling through a slow-moving body of sludge to transfer momentum and create a pumping action as the two liquids blend to an intermediate velocity. The combining liquids are forced through the venturi tube, thus creating a pump that adds energy to the liquid stream. Most importantly, the combined liquids are thoroughly mixed to provide a homogeneous liquid sludge mass in the digester vessel.

More specifically, a method of anaerobically digesting sludge is provided comprising filling an enclosed anaerobic sludge digestion vessel with liquid sludge; the vessel being in the form of a shell having a substantially vertical axis and which is substantially circular in horizontal section for most of its height; the vessel having a substantially wide middle portion and gradually decreasing in width from the middle portion to a top end and a bottom end; a substantially vertical draft tube being substantially axially positioned in the vessel and having an upper end spaced downwardly of the vessel top end and a lower end spaced upwardly of the vessel bottom end; a first venturi tube having a lower inlet means and which is axially positioned and in liquid sludge communication with and forming part of the lower end of the draft tube; first conduit means communicating with the vessel bottom interior space beneath the venturi tube; the first conduit means having a jet nozzle axially positioned beneath, and upwardly directed with respect to, the first venturi tube; maintaining the vessel liquid sludge content at a level near the draft tube upper end and at a temperature which is highly conducive to digestion of the sludge by anaerobic microorganisms; and feeding a pressurized stream of liquid sludge through the first conduit means and out of the first jet nozzle as a high velocity jet stream directed into the first venturi tube thereby creating suction around the venturi tube inlet means and producing a pumping action which causes a stream of liquid sludge in the vessel bottom space to flow into the inlet means and through the first venturi tube and upwardly through and out of the upper end of the draft tube to thoroughly admix and disperse with the pressurized sludge stream supplied by the jet nozzle and also causing downward circulating flow of liquid sludge in the vessel.

In practicing the method, partially anaerobically processed or digested liquid sludge can be withdrawn from the vessel and fed to the first conduit means. Also, anaerobically unprocessed or raw liquid sludge alone or with partially processed sludge can be fed to the first conduit means.

The described method can include passing the liquid sludge through a heat exchanger to regulate the sludge temperature before it is fed to the first conduit.

In another embodiment of the method a second venturi tube having an upper inlet means is axially positioned in liquid communication with and forming part of the draft tube upper end; a third conduit means communicates with the vessel upper interior space above the venturi tube; and the third conduit means has a jet nozzle axially positioned above, and downwardly directed with respect to, the second venturi tube; and, when the first jet nozzle is inactive, a pressurized stream of liquid sludge is fed through the third conduit means and out of the second jet nozzle as a jet stream directed into the second venturi tube thereby creating suction around the venturi tube inlet means and producing a pumping action which causes a stream of liquid sludge in the vessel upper space to flow into the inlet means and through the second venturi tube, downwardly through the draft tube and out of the lower end of the draft tube thereby causing settled material on the vessel bottom to be dispersed into the vessel contents and also causing an upward circulating flow of liquid sludge in the vessel.

Partially anaerobically processed or digested liquid sludge can be withdrawn from the vessel and be fed to the third conduit means. Also, anaerobically unprocessed or raw liquid sludge alone, or with partially anaerobically processed sludge, can be fed to the third conduit means. The liquid sludge can be passed through a heat exchanger to regulate the sludge temperature before it is fed to the third conduit.

In a further embodiment of the method, a third venturi tube is substantially horizontally positioned in the vessel substantially tangential or normal to a radius extending horizontally outward from the vessel vertical axis; a fourth conduit means communicates with the vessel interior space for supplying liquid sludge thereto; the fourth conduit means has a jet nozzle axially positioned relative to the third venturi tube; and a pressurized stream of liquid sludge is fed through the fourth conduit means and out of the third jet nozzle as a jet stream directed into the third venturi tube thereby creating suction around the venturi tube inlet means and producing a pumping action which causes a stream of liquid sludge in the vessel to flow into the third venturi tube inlet means, through the third venturi tube and outwardly therefrom thereby causing circular rotation, dispersion and mixing of liquid sludge in the vessel.

The just described method can be suitably employed in small digester vessels using only the jet nozzle and without the third venturi tube.

Partially anaerobically processed or digested liquid sludge from the vessel can be fed to the fourth conduit means. Also, anaerobically unprocessed or raw liquid sludge alone, or with partially anaerobically processed liquid sludge, can be fed to the fourth conduit means. The liquid sludge can be passed through a heat exchanger to regulate the sludge temperature before it is fed to the fourth conduit.

The various embodiments of the method can be practiced with vessel shells having shapes such as those described above as well as those in prior art use.

According to a second aspect of the invention apparatus for anaerobic sludge digestion is provided comprising an enclosed vessel in the form of a shell having a a top and bottom; a substantially vertical draft tube positioned in the vessel; the draft tube having an upper end spaced downwardly of the vessel top; the draft tube having a lower end spaced upward of the vessel bottom; the draft tube having a lower end including a venturi tube with an inlet means spaced upward of the vessel bottom; and a liquid sludge-supplying first conduit means communicating with a jet nozzle operatively positioned and in communication with the venturi tube inlet means for feeding liquid sludge through the jet nozzle into the venturi tube inlet means to a lower pressure thereby producing a pumping action which causes a stream of liquid sludge in the vessel bottom space to flow into the venturi tube and then upwardly in the draft tube and out of the draft tube upper end and to thoroughly admix and disperse with the sludge stream fed to the jet nozzle and also causing downward circulating flow of liquid sludge in the vessel. The vessel in such apparatus can have a shell which has a substantially vertical axis and be substantially circular in horizontal section.

More specifically the invention provides apparatus for anaerobic sludge digestion comprising an enclosed vessel in the form of a shell having a vertical axis and which is circular in horizontal section for most of its height; the vessel having a substantially wide middle portion and gradually decreasing in width from the middle portion to a top end and a bottom end; a vertical draft tube, substantially axially positioned in the vessel; the draft tube having an upper end spaced downwardly of the vessel top end; the draft tube having a lower end including a first venturi tube with an inlet means spaced upward of the vessel bottom end; first conduit means communicating with the vessel bottom interior space beneath the venturi tube inlet means for supplying liquid sludge thereto; the first conduit means having a jet nozzle axially positioned beneath, and upwardly directed with respect to, the first venturi tube; and means for feeding liquid sludge through the first conduit means and out the first jet nozzle as a jet stream directed into the first venturi tube inlet means thereby producing a pumping action which causes a stream of liquid sludge in the vessel bottom space to flow into the inlet means, through the first venturi tube and upwardly through the draft tube and out the Upper end of the draft tube thereby thoroughly mixing the sludge streams together and causing downward circulation of liquid sludge in the vessel.

The apparatus can include a second conduit means communicating with an interior portion of the vessel for withdrawing partially processed or digested liquid sludge therefrom and feeding it to the first conduit means. The apparatus, furthermore, can have means for feeding anaerobically unprocessed or raw liquid sludge alone, or with partially anaerobically processed sludge, to the first conduit means. Also, the second conduit means can have an outlet communicating with a heat exchanger means external of the vessel for controlling the temperature of liquid sludge in the vessel; and the first conduit means can have an inlet communicating with an outlet of the heat exchanger means for receiving liquid sludge therefrom. Mechanical pump means for pressurizing liquid sludge in the first conduit means can also be included.

In a further embodiment the apparatus can include a second venturi tube having an upper inlet means axially positioned in liquid communication with the draft tube upper end; third conduit means communicating with the vessel upper interior space above the venturi tube inlet means for supplying liquid sludge thereto; the third conduit means-having a jet nozzle axially positioned above, and downwardly directed with respect to, the second venturi tube; and means for feeding liquid sludge through the third conduit means and out of the second jet nozzle as a jet stream -directed into the second venturi tube thereby producing a pumping action which causes a stream of liquid sludge in the vessel upper space to flow into the second venturi tube inlet means, through the second venturi tube and downwardly through the draft tube and out of the lower end of the draft tube thereby causing settled material on the vessel bottom to be dispersed into the vessel contents and also causing an upward circulating flow of liquid sludge in the vessel.

A second conduit means can communicate with an interior portion of the vessel for withdrawing partially anaerobically processed or digested liquid sludge therefrom and feeding it to the third conduit means. The second conduit means can have an outlet communicating with a heat exchanger means external of the vessel for controlling the temperature of liquid sludge in the vessel; and the third conduit means can have an inlet communicating with an outlet of the heat exchanger means for receiving liquid sludge therefrom. Mechanical pump means for pressurizing liquid sludge in the third conduit means can be included.

In a further aspect of the invention apparatus is provided having a third venturi tube substantially horizontally positioned in the vessel and substantially normal or tangential to a radius extending horizontally outward from the vessel vertical axis; a fourth conduit means for supplying liquid sludge to the vessel interior space; the fourth conduit means having a jet nozzle axially positioned relative to the third venturi tube; and means for feeding liquid sludge through the fourth conduit means and out of the third jet nozzle as a jet stream directed into the third venturi tube thereby producing a pumping action which causes a stream of liquid sludge in the vessel to flow into the third venturi tube inlet means, through the third venturi tube and outwardly therefrom thereby causing circular rotation, dispersion and mixing of liquid sludge in the vessel.

The apparatus can have a second conduit means communicating with an interior portion of the vessel for withdrawing partially processed or digested liquid sludge therefrom and feeding it to the fourth conduit means. Also, the apparatus can have means for feeding anaerobically unprocessed or raw liquid sludge alone, or with partially anaerobically processed sludge, to the fourth conduit means. The second conduit means can have an outlet communicating with a heat exchanger means external of the vessel for controlling the temperature of liquid sludge in the vessel; and the fourth conduit can have an inlet communicating with an outlet of the heat exchanger means for receiving liquid sludge therefrom. A mechanical pump means for pressurizing liquid sludge in the fourth conduit means can also be included.

It is generally desirable for the apparatus to have a radially outwardly projecting sludge slinger located above the draft tube upper end for horizontally deflecting liquid sludge flowing upwardly out of the draft tube into a swirl motion.

Preferably, the vessel shell is of generally elliptical shape in vertical axial section. More specifically, a generally egg shaped shell which is vertically symmetrical from a horizontal central plane is desirably used. However, a vessel having a circular cylindrical middle portion, a substantially conical upper portion, or an upper spherical portion, joined to the middle portion and a substantially conical lower portion joined to the middle portion, with the vessel diameter greatest at the middle portion, is also suitable. However, the vessel can also have a substantially circular cylindrical side wall, a nearly or substantially flat or conical bottom and a domed, conical or a nearly or substantially flat roof.

BRIEF DESCRIPTION OF THE DRAWINGS

FIG. 7 is an isometric view of the bottom internal portion of the vessel shown in FIG. 6;

FIG. 8 is an isometric view of the top internal portion of the anaerobic vessel shown in FIG. 6;

FIG. 11 is essentially identical to FIG. 6 but illustrates operation of the apparatus to mix sludge from an upper zone of the vessel with sludge in the mid zone with helical or spiral circulation of the liquid mass in the vessel;

FIG. 12 illustrates an anaerobic sludge digester vessel having a jet pump at the bottom end of a draft tube but with no jet pump at the top end of the draft tube;

DETAILED DESCRIPTION OF THE DRAWINGS

To the extent it is reasonable and practical the same or similar elements which appear in the various views of the drawings will be identified by the same numbers.

FIGS. 1 to 5 show various anaerobic sludge digester vessel shapes which can be used in practicing the subject invention.

Figure 1:
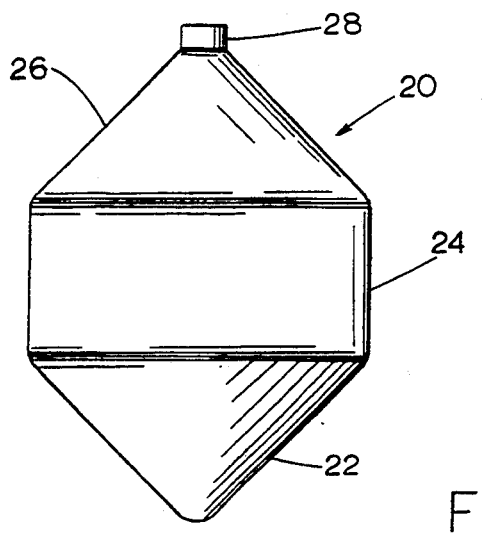
FIG. 1 is an elevational view of a prior art anaerobic sludge digester vessel used in Germany.

The vessel 20 shown in FIG. 1 has a conical shell bottom section 22, a circular cylindrical shell middle section 24, and a conical shell top section 26 and a gas-collecting top cylindrical shell 28. An anaerobic vessel having the shape shown in FIG. 1 has been previously used in Germany.

Figure 2:
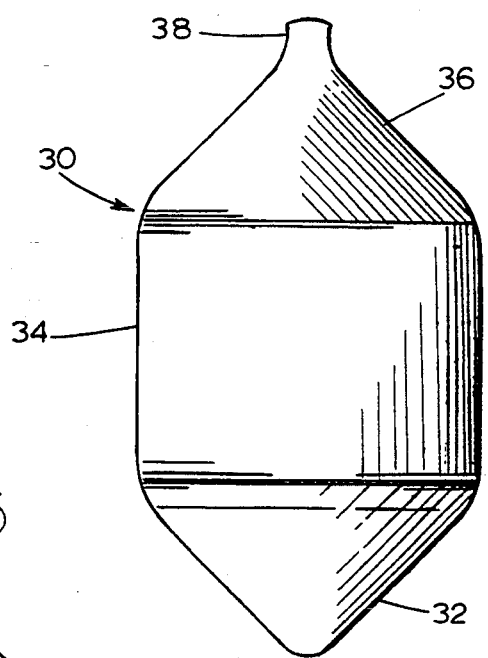
FIG. 2 is an elevational view of a prior art anaerobic sludge digester vessel which is a taller modification of the vessel shown in FIG. 1.

FIG. 2 also illustrates the shape of an anaerobic sludge digester vessel previously used in Germany. The vessel 30 has a conical shell bottom section 32, a circular cylindrical shell middle section 34 which is taller than the similar section 24 in the vessel shown in FIG. 1, a conical shell top section 36, and a gas collecting shell top cylindrical section 38.

Figure 3:
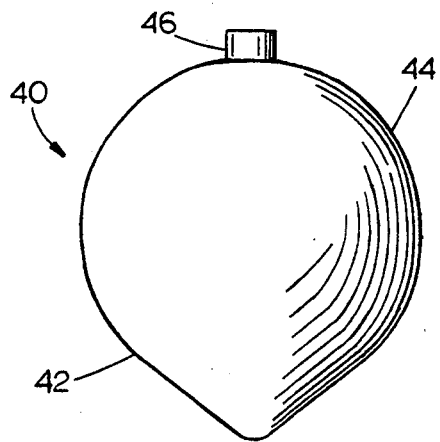
FIG. 3 is an elevational view of an anaerobic sludge digester vessel characterized by a low height to diameter ratio.

FIG. 3 illustrates the shape of an anaerobic sludge digester vessel suitable for smaller facilities. The vessel 40 has a conical shell bottom section 42 which is joined to a spherical section 44 which has a gas-collecting top cylindrical shell 46.

Figure 4:
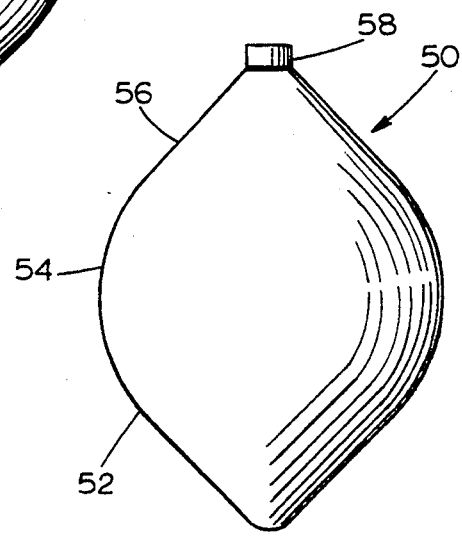
FIG. 4 is an elevational view of still another shape of an anaerobic sludge digester vessel.

The anaerobic sludge digester vessel 50 illustrated in FIG. 4 has a conical shell bottom section 52, a spherical shell middle section 54, a top conical shell section 56, and a gas-collecting top cylindrical shell 58.

Figure 5:
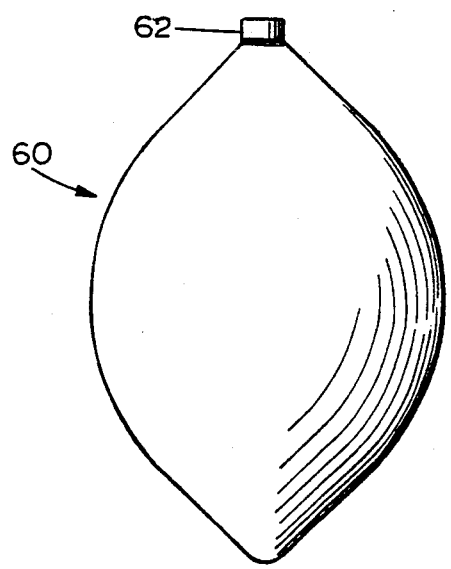
FIG. 5 is an elevational view of a generally egg-shaped anaerobic sludge digester vessel presently considered the ideal shape for such a vessel.

FIG. 5 illustrates the presently preferred shape for an anaerobic sludge digester vessel. The vessel 60 is generally egg-shaped with almost all surfaces being double-curved surfaces although the lower-most and upper-most sections may be conical. Vessel 60 also has a gas-collecting top cylindrical shell 62.

All of the vessels illustrated in FIGS. 1 to 5 have a vertical axis and are circular in horizontal section for most of their height. They have a wide middle portion and gradually decrease in width from the middle portion to a top end and a bottom end.

The bottom conical shell sections for the vessels illustrated in FIGS. 1 to 5, and other vessels useful in this invention, desirably have a steep side slope of at least 35 degrees, and desirably at least 45 degrees, from horizontal. The bottom cone has a very important function in that it provides a transition zone for digester liquid to move to or from the vessel bottom and the lower end of the draft tube. The slope of the conical shell should be adequate to ensure that digesting sludge will not settle and thus be isolated from process mixing.

The shape and height of the vessel middle zone, which provides most of the vessel volume, is largely dictated by process capacity requirements and facility site conditions. The process volume requirements are set by the amount of sludge to be treated and the degree of stability that is desired from the final digested sludge product. In general, the vessel height or depth should be at least 1.2 times, and desirably at least 1.5 times, greater than the major diameter of the vessel.

The vessel top conical shell section provides a transition from the concentrated mixing zone at the top of the draft tube, to be further described subsequently, herein and it also minimizes the liquid sludge surface area available for foam and scum accumulation to a small and manageable size. The slope of the upper conical section should be at least 15 degrees, and desirably a slope of up to about 45 degrees, from horizontal.

Figure 6:
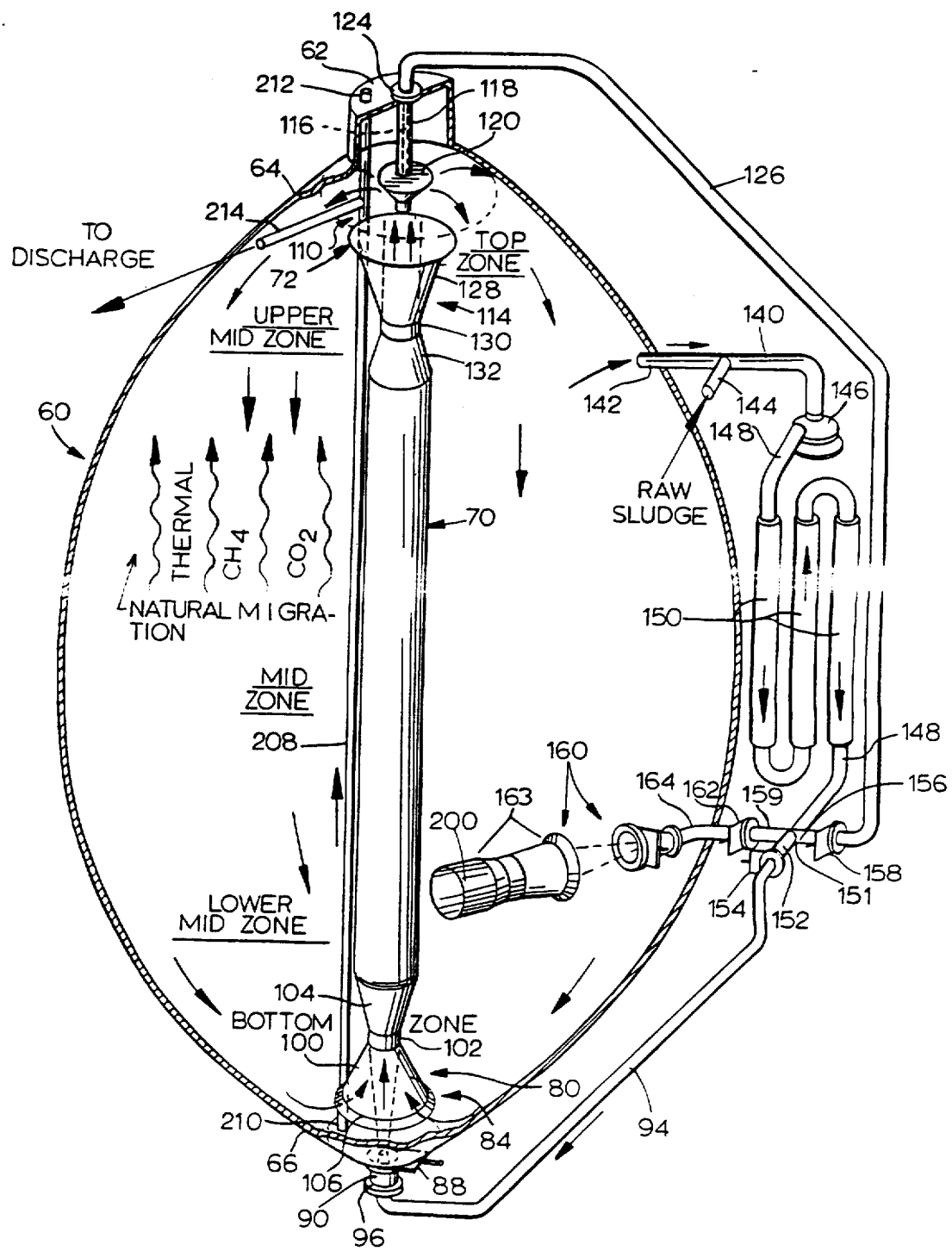
FIG. 6 is an isometric view, partially in section, of an anaerobic sludge digester vessel having a jet pump at the lower and upper ends of a draft tube, and a substantially horizontal jet pump and illustrates operation of the bottom jet pump.

The anaerobic sludge digester apparatus illustrated by FIG. 6 constitutes a first, and is presently considered to constitute the best, embodiment of the invention. The apparatus shown in FIG. 6 includes an egg-shaped sludge digester vessel 60 as described with reference to FIG. 5.

Draft tube 70 is shown vertically and axially located in vessel 60. The upper end 72 of draft tube 70 is spaced downwardly of the vessel top 64 and the lower end 80 of draft tube 70 is spaced upwardly of the vessel conical bottom 66.

A first jet pump 84 is located in the bottom portion of vessel 60. The jet pump 84 includes a jet nozzle 82 and a venturi tube 80 (FIGS. 6 and 7).

The bottom end of vessel 60 has an opening 86 which is closeable by a gate valve 88 joined to the vessel around the opening. A stub tube 90 extends downwards from the gate valve 88 and ends in a flange 92. Conduit 94 has jet nozzle 82 at its end and disk plate 96 is joined to conduit 94 a short distance upstream of the jet nozzle. Disk plate 96 is removably connected to flange 92 and when so connected the tip of jet nozzle 82 is positioned adjacent but below the movable gate of gate valve 88. This arrangement permits the jet nozzle 82 to be removed when the gate valve 88 is closed by disconnecting disk plate 96 from flange 92. As a result it is unnecessary to drain the sludge from the vessel before removing the jet nozzle 82 for cleaning, repair or replacement.

The draft tube 70 includes a venturi tube 80 at its lower end. The venturi tube 80 as illustrated comprises a converging diffuser tube portion 100, a throat portion 102 and a diverging discharge tube portion 104 (FIGS. 6 and 7). A bell mouth 106 can be positioned at the end of diffuser tube portion 100. However, it is feasible to eliminate the converging diffuser tube 100 and to place a bell mouth 106 on the lower end of throat portion 102. The bell mouth 106 is located at the vessel bottom so as to channel the digester bottom contents into the venturi tube 80 to be intimately mixed with the driving jet stream of sludge from jet nozzle 82.

A second jet pump 110 is located in the upper portion of vessel 60. The jet pump 110 includes a jet nozzle 112 and a venturi tube 114 (FIGS. 6 and 8). The second jet pump 110 can be sized the same as or differently than the first jet pump 84.

The jet nozzle 112 is connected to the lower end of conduit 116 which slides freely, but in a gas tight manner, in sleeve or pipe 118 which fixedly supports a conical sludge slinger 120 having helical ribs or splines 122. The top of pipe 118 is joined to the top of shell 62. The sludge slinger 120 is axially connected to pipe 118 and is thereby fixed in place with respect to the top of venturi tube 114 (FIGS. 6 and 8). Slinger 120 has a vertical axial hole through which jet nozzle 112 and its supporting conduit 116 can be inserted. By means of a coupling 124 (FIG. 6) the upper end of conduit 116 is removably connected to conduit 126. The mouth of the jet nozzle 112 and the slinger lower edge are positioned far enough beneath the surface of liquid sludge in the vessel 60 so that nozzle 112 and conduit 116 can be removed without gas escaping from vessel 60.

The venturi tube 114 (FIG. 8) as illustrated comprises a converging diffuser tube portion 128, a throat portion 130 and a diverging discharge tube portion 132. A bell mouth 134 can be positioned at the upper end of diffuser tube portion 128. Also, the converging diffuser tube may be eliminated and bell mouth 134 attached directly to the upper end of throat portion 130. The bell mouth 134 is to be carefully positioned to assure pumpage will occur when jet pump 110 is activated but still have adequate impact on top mixing when there is upward sludge flow in the draft tube 70.

Conduit 140 (FIG. 6) has an inlet 142 communicating with the upper mid-zone of vessel 60 for withdrawing sludge therefrom to be circulated and mixed with sludge in other areas of the vessel. The outlet end of conduit 140 is connected to pump 146. Branch conduit 144 communicates with conduit 140 and is used to introduce raw sludge into the digester vessel 60. Conduit 148 receives the stream of sludge exiting from pump 146 and feeds it through a pipe-in-pipe heat exchanger 150 to heat or cool the sludge stream to a temperature suitable for optimum anaerobic digestion. Conduit 148 delivers the sludge stream to a three-way cross-fitting 150 which can divert some or all of the sludge stream as is appropriate. Thus, conduit 152 communicates with fitting 150 and valve 154; conduit 156 communicates with fitting 150 and valve 158; and, conduit 159 communicates with valve 162 (FIG. 6). When it is desired to feed a driving stream of sludge only to jet pump 84, valve 154 is open and valves 158 and 162 are closed. However, to feed a driving stream of sludge only to jet pump 110, valve 158 is open and valves 154 and 162 are closed. As will be subsequently further discussed herein, valve 162 can be open to divert sludge through it to conduit 164 while either valve 154 or valve 158 is open.

Figure 9:
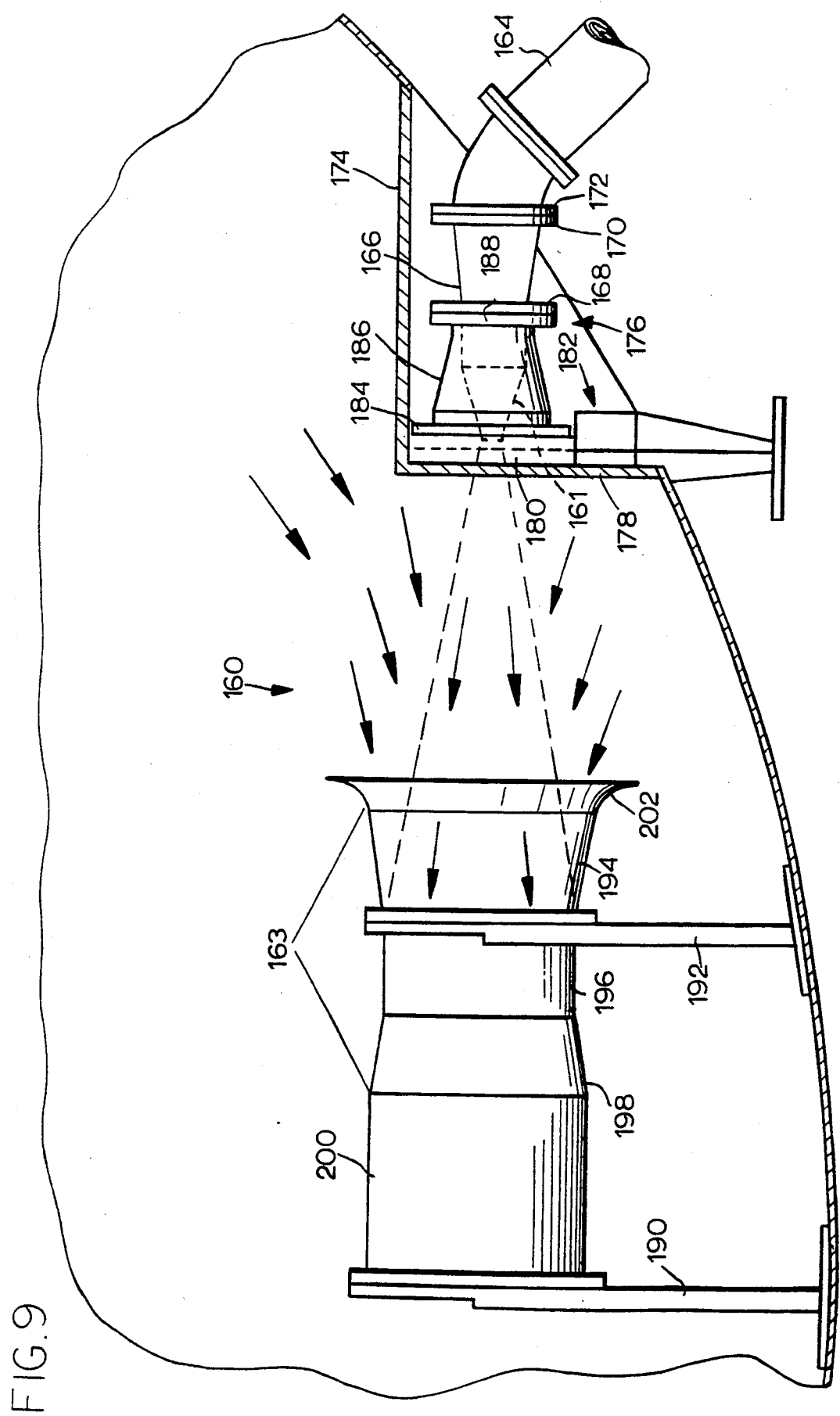
FIG. 9 is a plan view, partially in section, illustrating the structural arrangement of the third jet pump mounted in the vessel side wall.

A third jet pump 160 is positioned in the lower mid-zone of vessel 60 (FIGS. 6 and 9). The jet pump can be positioned at a location which is about 20 to 50% of the vessel height measured from the vessel bottom. The jet pump 160 can be sized to be effective in a range of flow which is about 40 to 100% of that in jet pump 110, and which is established by design considerations. The jet pump 160 includes a jet nozzle 161 and a venturi tube 163.

The jet nozzle 161 is connected to the end of transition member 166 having end flanges 168,170. Conduit 164 has an end flange 172 which is removably connected to flange 170.

A circular cylindrical horizontal member 174 is joined to the vessel 60 wall around a mating opening 176 cut approximately tangentially to the vessel. The inner end of the cylindrical member 174 has a metal ring 178 connected to it. The ring 178 is positioned so as to permit a stream of sludge flowing from jet nozzle 161 to pass through a circular hole in the ring 178.

The body portion 180 of a gate valve 182 is positioned between ring 178 and the flange 184 of truncated conical transition member 186. End flange 188 of transition member 186 is removably connected to flange 168. The front end or tip of jet nozzle 161 is located in the front or upstream of the downstream gate valve 182 so that when the valve is closed no sludge can flow out of the vessel 60. This permits removal of the jet nozzle 161 for cleaning, repair or replacement by separating flanges 170,172 and flanges 168,188.

Venturi tube 163 is supported substantially horizontally and tangentially to the wall of vessel 60, but in axial alignment with jet nozzle 161, by brackets 190,192. The venturi tube 163 as illustrated includes a converging diffuser tube portion 194, a throat portion 196 and a diverging discharge tube portion 198 to which a short tube 200 is connected to keep the sludge discharge stream from spreading out too much (FIG. 9). A bell mouth 202 can be positioned at the end of diffuser tube portion 194. However, the diffuser tube portion 194 can be eliminated and a bell mouth joined directly to the throat portion 196.

A digested sludge draw-off vertical conduit 208 is positioned in vessel 60 reasonably close to draft tube 70. The lower end 210 of the conduit 208 is positioned sufficiently above the bottom of the vessel so as to avoid having grit and the like plug up the conduit open lower end. The upper portion of conduit 208 projects through the gas-collecting top cylindrical shell 62 and has its upper end 212 open to the atmosphere. A substantially horizontal branch sludge discharge conduit 214 communicates with conduit 208 and extends through the vessel wall portion 64. The conduit 214 is located about midway between the top of bell mouth 134 and the top of slinger 120. The position of horizontal conduit 214 automatically sets the position of the sludge surface or liquid level in the digester vessel. The position of conduit 214 is carefully established with regard to the design of the jet pump 110. If desirable, conduit 214 can be sloped slightly downwards from where it joins conduit 208 to help prevent plugging the conduit by increasing the flow rate.

The apparatus illustrated by FIG. 6 can be operated in at least five different modes summarized as follows according to which jet pump(s) are used:
  First mode—only jet pump 84 is used.
  Second mode—only jet pump 110 is used.
  Third mode—only jet pump 160 is used.
  Fourth mode—only jet pumps 84 and 160 are used simultaneously.
  Fifth mode—only jet pumps 110 and 160 are used simultaneously.

From the above summary it will be observed that jet pumps 84 and 110 are not used, simultaneously or together because they would be pumping sludge into the draft tube in opposite directions and thereby defeat the intended mixing and sludge distribution in the vessel with minimum energy consumption.

The preferred method utilizes the subsequently described first mode, second mode and fifth mode in sequence to process the digesting sludge mass. In the first mode, liquid is drawn from the digester upper middle zone and intimately mixed with digester mass from the digester bottom. The liquid travels vertically upwards in the draft tube and further mixes with digester top liquid at its discharge point. In the second mode, liquid is pumped from the digester upper middle zone and intimately mixed with digester mass from the digester top. The liquid travels down the draft tube and further mixes with digester bottom liquid at its discharge point. Third, using the fifth mode, a horizontal swirl is added to the action taking place in mode 2 to intermix large masses of the lower digester content. The time allotted to each of the three modes is microprocessor-controlled and is changeable in accordance with specific process conditions. Generally, the preferred process will have it's total time allotted as follows:
  Mode 1=40–60% of operation time
  Mode 2=20–40% of operation time
  Mode 5=5–25% of operation time

FIG. 6 APPARATUS—FIRST MODE OF OPERATION

In the first mode of operation, flow of sludge in the central dual jet pump draft tube mixer 70 is upward as jet pump 84 operates by feeding a stream of sludge through nozzle 82 into the converging diffuser tube portion 100 of the venturi tube 80. The high velocity jet stream which flows out of the nozzle 82 creates a low pressure space around the bell mouth 106 entry to the diffuser tube portion 100. This causes sludge in the bottom zone of vessel 60, including heavier than water materials which sink to the bottom to flow into the venturi tube and to be pumped upward through the draft tube 70 at a high velocity, such as at least one meter per second. The jet pump can be activated by driven sludge from any source but desirably it is activated with sludge withdrawn from an upper portion of the digester vessel 60. Thus, sludge can be withdrawn from the upper mid-zone of the vessel through the inlet 142 of conduit 140. If desired, raw sludge can be introduced, by means of conduit 144, into the sludge stream flowing in conduit 140. The combined stream flows to pump 146 which pumps it through conduit 148 in which the combined sludge stream is adjusted to the correct sludge temperature by means of heat exchanger 150 before it is fed through open valve 154, with valves 158,162 being closed. The sludge stream flows out of valve 154 to conduit 94 which delivers it to jet nozzle 82 from which it is expelled at high velocity as a drive stream for the jet pump. The digesting sludge that is drawn from the vessel upper mid-zone is intimately mixed with the digesting sludge drawn from the vessel bottom zone into the pump venturi tube 80. The intimately mixed upward flowing sludge is transported to the digester vessel top by the draft tube 70. It is highly desirable for efficient anaerobic digestion to effectively mix the mature or ripe sludge with new raw and/or partially digested sludge to increase the process activity and effectiveness.

The upwardly flowing sludge stream passes through the venturi tube 114, at the top of the draft tube 70, where the sludge stream velocity is increased as it flows through the venturi throat portion 130. The upwardly discharged sludge impacts upon the static slinger 120. The slinger helical vanes 122 direct a portion of the sludge flow in a final circular motion as it settles over the liquid sludge surface at the top of the digester vessel. The circular motion provides some stirring and this, when coupled with the outward migration of the active surface flow, causes wetting of surface foam and scum thereby causing it to sink down into the digesting mass. This final mixing is very effectively provided by mingling the heavier masses from the vessel bottom with the lighter masses at the vessel top.

The sludge pumped to the top steadily migrates from the top to the bottom with about one-fifth to one-tenth of the mass migrating to the inlet 142 of conduit 140. The general downward migration is 180 degrees out of phase with the natural mixing created by thermal currents and the upward rise of gas as it rises to the digesting sludge liquid surface. The shape of the vessel makes a major contribution to the maximum effectiveness of the interference mixing created by the opposing downward movement of sludge outside of the draft tube caused by operation of jet pump 84 and the upward natural thermal and gas-induced migration.

The described first mode of operation is the principal and most important digester mixing mode. For some anaerobic digestion operations it need be the only mixing mode used. Even when used with the other mixing modes, either simultaneously or sequentially, the first mode would be used for a large portion of the total mixing time.

FIG. 6 APPARATUS—SECOND MODE OF OPERATION

Figure 10:
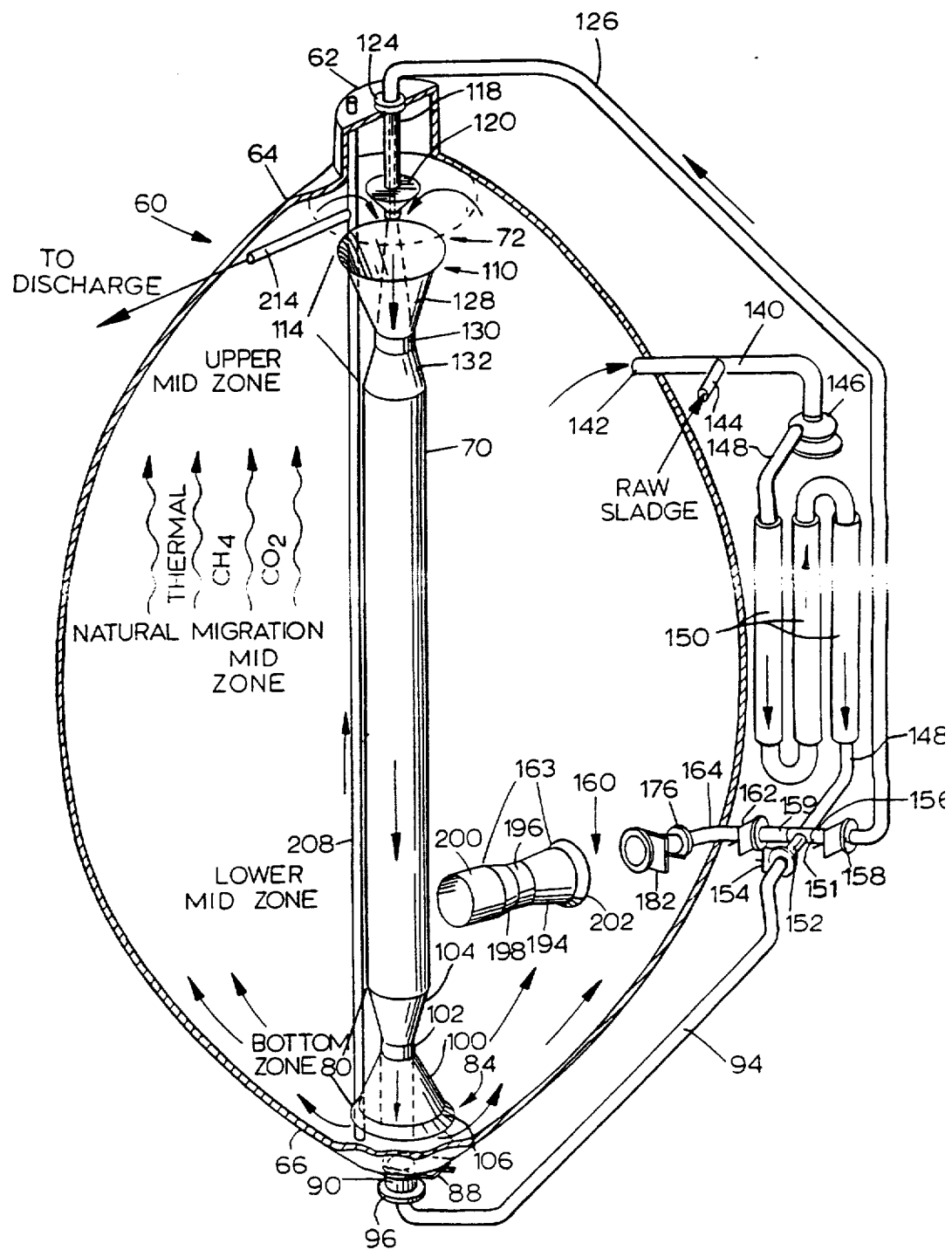
FIG. 10 is essentially identical to FIG. 6 but illustrates operation of the top jet pump to produce downward flow and mixing of sludge in the draft tube.

In the second mode of operation, flow of sludge in the central dual jet pump draft tube mixer 70 is downward as shown in FIG. 10, which is the reverse of sludge flow therein in the first mode. Furthermore, the second jet pump 110 is in use in the second mode while the first jet pump 84 is inactive.

The apparatus is operated in the second mode as shown in FIG. 10 to mix the lighter sludge materials at the top of the digester vessel with the heavier sludge materials at the bottom of the vessel so as to maximize the intermingling of digesting masses from different zones of the vessel.

Although sludge from any source could be used as the driving liquid fed to the jet nozzle 112 of the second jet pump 110 at the top of the vessel 60, it is generally desirable to use, in whole or in part, sludge withdrawn from an upper zone of the vessel. More specifically, the sludge stream leaving the heat exchanger 150 in conduit 148 can be fed through open valve 158 to conduit 126, with valves 154,162 closed. The pressurized sludge stream is fed by conduit 126 to conduit 116 which feeds it to jet nozzle 112. The high velocity stream of sludge expelled out of jet nozzle 112 constitutes a drive stream for the second jet pump. The sludge drive stream expands into diffuser tube portion 128 of venturi tube 114 and it has its maximum expansion at the entrance to the throat portion 130. The high velocity driving sludge stream creates suction causing downward flow that draws lighter materials from the digester top zone into the jet pump venturi tube 114. Digesting sludge from the upper mid-zone, or some other zone of the vessel, are intimately mixed with sludge from the top zone while light and otherwise objectionable materials are sucked into the downward-pumping jet pump 110 to create a mixture of digesting masses that is discharged through the bottom inactive and passive venturi tube 80 with a velocity increase as the sludge exits. When the downwardly pumped sludge exits the draft tube 70 it is mixed with the heavier sludges that migrate downwardly in the vessel conical bottom portion 66. The different characteristics of these sludges creates very effective mixing in the final part of this mode of operation.

Although the described second mode of operation can be used independently of any other modes described herein, it cannot be used simultaneously with the first mode. However, a very effective anaerobic process is obtained by using the second mode intermittently with the first mode.

FIG. 6 APPARATUS—THIRD MODE OF OPERATION

In the third mode of operation only the third jet pump 160 is used and the first and second jet pumps 84 and 110 are inactive.

In this mode of operation, the stream of sludge exiting heat exchanger 150 is fed by conduit 148 to conduit 159 and by it to open valve 162 with valves 154,158 closed. The pressurized sludge exits valve 162 into conduit 164 which feeds it to transition member 166 from which it flows through jet nozzle 161 as a high velocity expanding stream through open valve 182 into the diffuser converging tube 194 of venturi tube 163. This results in development of a lower pressure around the inlet of the venturi tube thereby causing sludge in the vessel lower mid-zone to flow into the venturi tube 163 and be driven therethrough by the high velocity driving sludge from the jet nozzle 161. The sludges from the different vessel zones are thoroughly mixed in the venturi tube. The sludge stream exits the venturi tube horizontally and at a high velocity tangentially to the vessel wall thereby providing a swirl motion to the digester vessel contents with large circulation and the creation of strong currents within the digesting mass. This creates optimum mixing conditions for sludge in the outer zone of the digester vessel.

The use of jet pumps provides a unique and new means for substantially improving the digester mass mixing by causing liquid shearing and other physical phenomena that allow micro-volumes of digester mass to shift positions relative to each other. These position shifts ensure that the food, raw sludge and any of the intermediate bacteria-produced food products of the various species of anaerobic bacteria, becomes available to the maximum number of bacteria that use it as food. The prior art mixing devices, such as the compressed gas energized gas lift tube and the propeller pump-activated draft tube, do not create maximum conditions for mixing. Such mixing devices provide mass movement that is more akin to plug flow with a nominal amount of actual micro-mass displacement created in the immediate area of gas injection or propeller motion.

FIG. 6 APPARATUS—FOURTH MODE OF OPERATION

In the fourth mode of operation of the apparatus illustrated by FIG. 6, the jet pumps 84 and 160 are used simultaneously at least during a part of the entire digestion process. During this mode of operation the second jet pump 110 is inactive.

In performing the fourth mode of operation the jet pumps 84 and 160 are operated as described above concerning the first and third modes with, however, valves 154,162 open and valve 158 closed.

FIG. 6 APPARATUS—FIFTH MODE OF OPERATION

In using the apparatus of FIG. 6 in the fifth mode of operation, jet pumps 110,160 are used simultaneously at least during a part of the entire digestion process. FIG. 11 illustrates this mode of operation. During this mode of operation the first jet pump 84 is inactive. Also, the valves 158,162 are open and valve 154 is closed. The second and third jet pumps 110,160 are operated as described above concerning the second and third modes in order to perform the fifth mode of operation. (This ends the description of the fifth mode of operation.)

FIG. 12 illustrates a further embodiment of apparatus provided by the invention. The apparatus shown in FIG. 12 is similar in many respects to the apparatus illustrated in FIG. 6. However, as will be seen in FIG. 12, no jet pump is located at the top of draft tube 70 and no peripheral jet pump is located along the vessel side wall to receive sludge from conduit 164. The apparatus shown in FIG. 12 is particularly useful for very small to small digester systems which have less than about 1500 cubic meter digester vessel volumes.

The apparatus of FIG. 12, in its principal mode of operation, utilizes a bottom jet pump 84, such as previously described in conjunction with FIG. 6, to pump sludge received from conduit 94 upwardly in draft tube 70. In this-mode valve 154 is open and valve 162 is closed. The sludge is discharged from the top of draft tube 70 and it impinges on slinger 120 and is thereby spread outwardly in a circular motion. The slinger 120 is held in fixed position by being joined to support pipe 174 which is attached to the gas hood on top of the gas collecting cylindrical shell 62. The digestion enhancement advantages discussed above in regard to the first mode of operation of the FIG. 6 apparatus are also obtained by the described operation of the apparatus shown in Figure 12.

Figure 13:
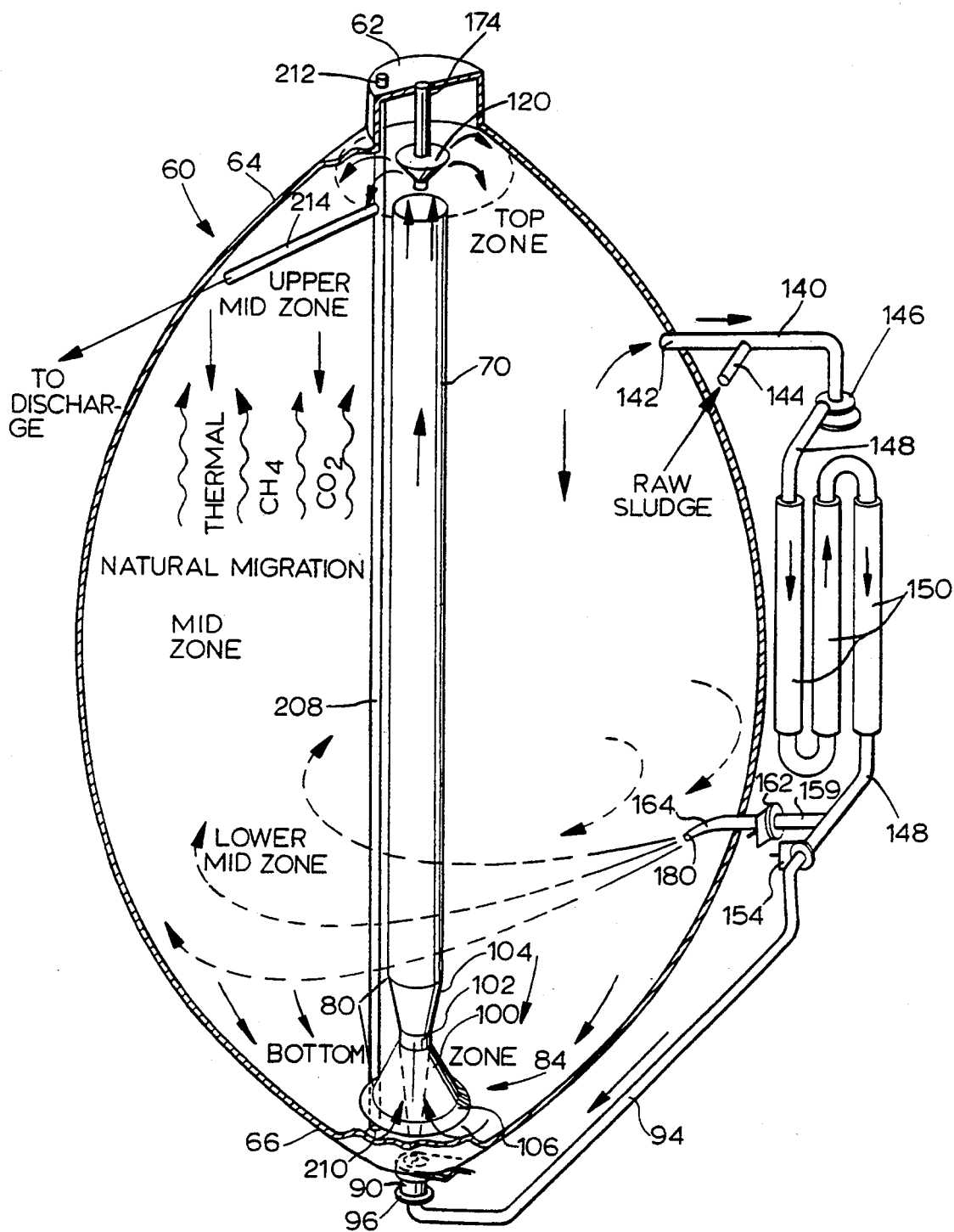
FIG. 13 is essentially like FIG. 12 but further illustrates the apparatus in use to mix sludge withdrawn from an upper portion of the vessel, optionally mix it with raw sludge and feeding the combined sludge into a lower mid portion of the liquid mass to mix it therewith and produce helical circulation and mixing of the liquid mass in the vessel.

The apparatus illustrated in FIG. 13 is identical to that shown in FIG. 12. However, FIG. 13 will be seen to illustrate the simultaneous utilization of the peripheral high velocity mixing nozzle 1180 at the end of conduit 164 to provide a swirl motion while the central vertical draft tube 70 conveys the jet-pumped mixture of sludge upward. Two factors make this system practical. One is the use of a small vessel which makes it possible for a free discharge high velocity nozzle 180 to provide the necessary mixing energy to obtain a relatively high circulation speed. A free discharge high velocity nozzle 1180 is not as efficient as jet pump 160 but is simple and more economical to install. The velocity of discharge at the nozzle 1180 orifice or outlet may be in the range of 6 to 15 meters per second. The energy for the swirl motion comes from the velocity head at the discharge outlet, which is defined as the square of the exit velocity in feet per second divided by two times the gravitational acceleration constant 32.2 feet per second squared. The swirl motion causes the heavier sludge to quickly migrate to the vessel bottom zone where it flows past bell mouth 106 into the inlet of the jet pump 84 that feeds the draft tube mixer 70. In normal operation, the nozzle 1180 need not be used continuously during the operation of jet pump 84. In general, the high velocity nozzle 1180 need be used only about 5% to 15% of the time. However, it is possible in some digesters to use only jet nozzle 1180 for helical mixing and not to employ jet pump 84 during a portion of the overall operation cycle. For such operation valve 154 would be closed and valve 162 would be open.

The pumped circuit external of the vessel which utilizes pump 146, although a second redundant pump may be placed in parallel to it, to provide the pressurized sludge driving liquid, should be as short as possible and have as few energy-absorbing fittings as is feasible. The external pumped circuit flow $Q_j$ is established by design requirements. The energy efficiency of the entire digester system is obtained through the use of a straightfoward and simple external pumped circuit for jet pump activation. The system suction point 142 where digester liquid is drawn out of the digester vessel is located well out from the draft tube 70 and above the vessel 60 mid-depth. The location of suction point 142 avoids allowing the pump 146 to pickup abrasive material from the vessel bottom area. By injecting raw sludge upstream of the heat exchanger 150 it is well mixed and brought to the proper digester temperature before being fed into the vessel.

MIXING SYSTEM SIZING PROCEDURE

Although jet pumps have been previously used for other purposes, it is believed that they have not been used previously in sludge digesting apparatus or methods. Accordingly, the following disclosure is presented as an aid in determining the proper size components and jet pumps to use.

A procedure for sizing the various components of this mixing system is presented below. The main steps in this procedure include: selecting a draft tube flow rate, selecting a draft diameter, selecting a venturi throat diameter, selecting the jet pump nozzle diameter, and selecting the external mechanical pump size.

1. DRAFT TUBE FLOW RATE

A specific draft tube flow rate is required to obtain optimum performance of the anaerobic digester. This flow rate is determined by such parameters as the size and shape of the digester vessel and the nature of the raw sludge. This draft tube flow rate, once determined, becomes the basic parameter around which the mixing system is designed.

2. DRAFT TUBE DIAMETER

The diameter of the draft tube 70 is selected to obtain a liquid velocity in the range of 1.25 to 2.25 meters per second. Velocities outside this range may be used, but they create special design considerations. It may be necessary to size the top and bottom jet pumps for different pumpage rates. This will allow the venturi throat 130 of the top jet pump 110 to provide adequate mixing velocity for slinger 120 action. An unnecessarily high velocity will cause excessive head loss. An unduly low velocity may not provide sludge inter-particle mixing and may be less effective in controlling surface foam and scum.

3. VENTURI THROAT DIAMETER

The venturi throat diameter will be smaller than the diameter of the draft tube. As the venturi throat diameter is decreased, the suction created by the venturi increases, tending to increase the entrained sludge flow rate. However, at the same time, the head loss associated with accelerating the flow through this reduced diameter increases, tending to decrease the entrained sludge flow rate. Thus, an optimum venturi throat diameter exists for a specific draft tube flow rate.

4. JET PUMP NOZZLE SIZING

The flow rate in the draft tube is made up of the flow from the jet nozzle and the flow entrained from the surrounding liquid. The entrained sludge flow rate is determined by the jet nozzle diameter, the venturi throat diameter, the liquid viscosity and the head loss characteristics of the entire bell mouth, venturi and draft tube assembly.

The basic entrainment occurs as the primary jet stream is expanding under substantially free jet conditions. The jet nozzle diameter is defined as $D_j$. The rate of jet expansion is primarily governed by the hydraulic properties of the liquid. The length of the jet, at the point where the jet has expanded to the diameter of the venturi throat, is defined as the dimension X. A pump ratio can be defined as the flow rate through the draft tube divided by the flow rate from the jet.

Figure 14:
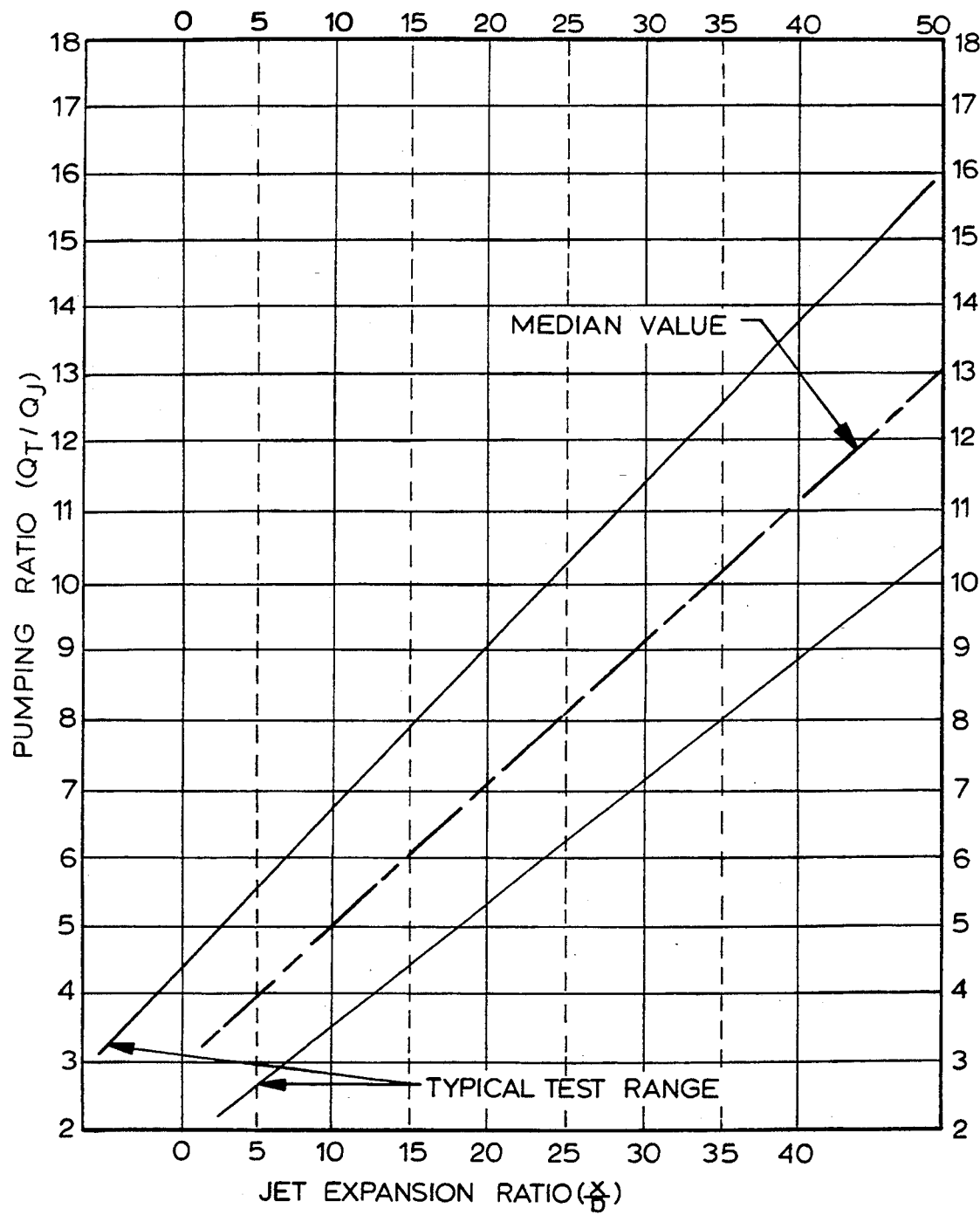
FIG. 14 is a graph which provides operating data for pumping sludge with jet pumps.

A fundamental relationship exists between X and the high velocity jet nozzle diameter at the instant of free discharge. This ratio is expressed as $X/D_j$. The jet pump capacity is expressed as a ratio of the total mixing flow divided by the jet nozzle flow just at the instant it becomes a free jet flow. The pumping ratio is $Q_t/Q_j$. $Q_t$ is the total mixing flow. $Q_j$ is the high velocity activating jet nozzle flow. Test results can be plotted on a graphical representation with $X/D_j$ as one axis and $Q_t/Q_j$ on a perpendicular axis. FIG. 14 shows such a graph which summarizes actual test data for water and synthetic sludge.

The primary jet nozzle velocity can be in the range of 9 to 15 meters per second. Values outside this range may not be practical even though they are theoretically feasible. The bottom jet pump 84 normally operates a majority of the time. The bottom head of the vessel must not be large, a 1.5 to 2 meter diameter is optimum. The access tube in the very bottom of the vessel must be short to allow the jet nozzle to develop its pumping quickly. The bell mouth 106 on the jet pump must be carefully located. The fluid flow velocities across the section between the bell mouth and the vessel cone 66 or bottom cap wall must be in a range of 0.2 to 0.6 meters per second, but should not be greater than at the entrance to the converging cone 100. There will be circumstances when the converging inlet cone is eliminated and only the bell mouth entrance is used.

The top of the dual jet pump 84,110 draft tube 70 sludge mixer has a jet pump 110 which may be sized exactly the same as the bottom jet pump 84 or in some cases may be sized smaller. The sizing difference will occur in large vessel systems.

The position of the venturi tube throat section above or below the jet nozzle is a function of the ratio $X/D_j$. X is the distance from the jet nozzle discharge outlet to where the jet stream expands to the venturi throat entrance diameter. The actual flow characteristics of the digesting sludge set the conditions for X to develop. The actual jet stream plume expansion angle must be established by experiment. For the top jet pump 110 the distance to the venturi throat entrance is set by X. In addition, the jet nozzle should discharge a minimum of 0.3 meter depth below the normal operating liquid level of the digester vessel (FIG. 14). The distance X establishes the plane where the top primary jet nozzle 112 is located. The length of the converging inlet cone 128 will be determined for each design by the liquid depth above the venturi throat 130. Under some design conditions, the converging cone may be eliminated leaving only the bell mouth.

The anaerobic process is a complex multi-step symbiotic biological process. Steady liquid temperatures; continuous steady raw sludge feed and a completely homogenous digesting mass substantially improves the process performance, stability and reliability. Previous system designs continued to increase conventional mixing energy and system complexity to deal with these governing fundamentals.

The subject invention has greatly improved the overall anaerobic digestion process in an efficient manner. Important apparatus and process steps are combined in an unobvious way to simplify the system and substantially reduce energy requirements. These may be summarized as follows:
1. Digester Vessel Shape The tall ellipsoidal egg shape allows for optimum process mixing with high energy efficiency.
2. Jet Pumps The jet pumps provide highly efficient pumping at very low pressure delivery requirements. The jet pump is unique in allowing selected digesting masses from different areas to be blended down to particle size when the high velocity jet intermingles with adjacent sludge as the jet stream expands.
3. Draft Tube The draft tube is an efficient and positive means for transporting large volumes of mass from bottom to top and visa versa.
4. External Pumped Circulation The requirements for feeding raw sludge and providing heat transfer are combined with the basic pumping requirements to activate the sludge mixing and transporting jet pumps. All moving mechanical equipment is located outside of the digester tank to minimize operational and maintenance problems.
5. Jet Pump Design The design concentrates on high efficiency pumping at low pressure increases with specific features such as the static slinger at the top of the draft tube and the combined bell mouth of the bottom jet pump and tank bottom.
6. Operation Modes The jet pump mixing modes are controlled to optimize the blending of different masses in the digester to provide optimum mixing and homogenous conditions.

The process control made possible through the sequential operation of the jet pumps and mixing thereby obtained is very important to this invention. The preferred process combines modes 1, 2 and 5. Mode 1 draws digesting sludge from the mid-upper digester zone, feeds raw sludge, mixes the two together, pumps the mixture through a heat exchanger and uses the pumped flow to energize a jet pump attached to a substantially vertical draft tube near the digester bottom. The high velocity jet stream draws surrounding bottom sludge into the stream and homogenizes the combined stream as it pumps upward into the draft tube mixer. The draft tube discharges the mixed sludge near the sludge surface with the kinetic energy dispersing the upwelling liquid over the liquid top surface, with the static slinger giving the upflow a final spin. This adds additional mixing action as the liquid mass disperses into the top of the liquid mass. A general top-to-bottom circulation optimizes the interference mixing which occurs when natural gas upward migration opposes the forced mass downward movement. The vessel shape has long vertical mixing pathways that optimizes natural mixing. The vessel converging top cone contributes substantially to mixing action.

Mode 2 reverses mode 1 and uses the pumped flow to energize a top jet pump attached to the vertical draft tube near the digester top. The high velocity stream draws surrounding surface sludge into the stream and homogenizes the combined stream as it pumps downward into the draft tube mixer. The suction action at the digester top surface draws any forming scum and foam into the flow stream and forces it back into the digesting mass. The draft tube discharges into a small bottom zone of the digester where it provides turbulence to mix the lighter top material with the heavier bottom material to further enhance the homogenous condition of the liquid mass. The digester vessel converging steep cone bottom contributes significantly to the mixing actions.

Mode 5 adds horizontal jet pump action located along the vessel wall in the digester vessel lower zone. In mode 5, both the jet pump of mode 2 and the horizontal jet pump are operating. The horizontal jet pump creates circular motion that does two things. It causes liquid in the outer zone of the digester to mix more effectively with the inner mass. Secondly, it destabilizes any heavier or lighter material that settles or sticks along the vessel bottom and upper shell portions and causes the mass to either settle or rise to a zone where it is forced back into the digester vessel liquid mass.

Mode 3 is a special case that activates only the horizontal jet pump and it may be activated to more thoroughly manage the digester cone bottom and top zones. It will generally be used under special circumstances such as when the facility must handle unusually large amounts of sand and grit.

Mode 4 is a special case that combines the upward pumping capacity of mode 1 with the horizontal pumping action of mode 3 for handling unusually large amounts of sand and grit. This action provides a strong bottom vessel cone cleansing action by destabilizing settled sludge on the surface of the vessel bottom cone. The bottom jet pump attached to the draft tube sucks the heavier material into the draft tube and distributes it over the surface of liquid in the digester. The heavier stable sludge acts to break up foam and scum at the surface.

Operation of modes 1, 2 and 5 in a routine and repeating sequence constitutes the preferred process. Operation of modes 1, 2, 4 and 5 is the second preferred process. Operation of mode 3 with either of the preferred operation methods is useful in special cases such as where large amounts of sand and grit must be handled.

Small digesters may not have a top jet pump and the horizontal jet pump can be replaced by a simple high velocity jet. Because of the small (less than 1,500 cubic meters) vessel configuration these system compromises reduce installation costs and further simplify operation.

Specific application of the jet pump apparatus in the ways described herein is novel and involves unique features.

First, the jet pumps operate in an anaerobic sewage sludge digestion environment to provide mixing and pumping.

Second, the jet pumps for this process are designed based primarily on free jet mixing. They pump large volumes of liquid and are required to provide only a very small nominal pressure increase.

Third, two jet pumps are positioned at the top and bottom ends of the same draft tube. The jet pumps are optimized for their high flow capacity and low pressure increase requirements.

Fourth, a static slinger can be combined with the top jet to provide enhanced process action.

Fifth, the bottom jet pump can combine a bell mouth entrance with the vessel bottom spherical or conical segment to optimize bottom cleansing and mixing action.

Sixth, the bottom jet pump energizing jet nozzle assembly can be isolated from the vessel by a gate valve and removed for inspection, repair or replacement.

Seventh, the horizontal jet pump energizing jet nozzle assembly can be isolated by a gate valve and removed for inspection, repair or replacement.

Eighth, the top jet pump energizing jet nozzle assembly can be removed through the static slinger gas isolation assembly without stopping digester operation or running the risk of gas loss and explosion dangers.

Figure 15:
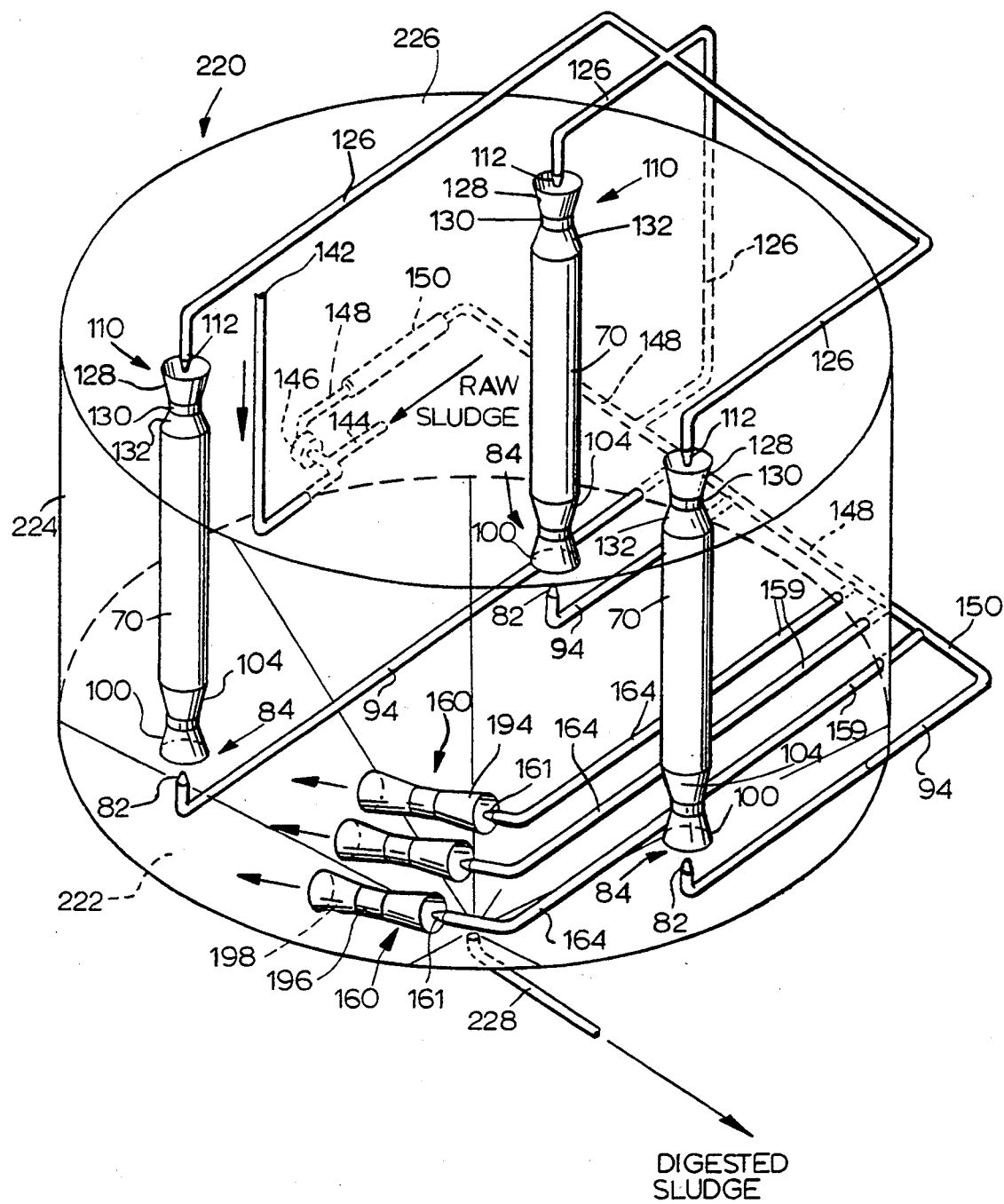
FIG. 15 is an isometric view, partially in section, of an anaerobic sludge digester vessel, which provides a large liquid surface area, having a nearly flat bottom, cylindrical wall and a substantially flat top, and which represents a type used in America, which has been provided with three draft tubes having a jet pump at each end and three horizontal jet pumps mounted on the vessel wall.

FIG. 15 illustrates the use of jet pumps according to the invention in a vessel or tank widely used in anaerobic digestion of sludge in America, i.e. the U.S. The vessel 220 has a substantially flat bottom 222, a vertical cylindrical circular side wall 224 and a substantially flat or low conical top or roof 226. The bottom of the vessel 220 is provided with a conduit 228 for withdrawing digested sludge.

The vessel 220 is shown provided with three draft tubes 70 and the related jet pumps 84,110 such as described in conjunction with FIG. 6. The vessel 220 is also provided with three jet pumps 160 positioned in the lower mid-zone of the vessel. The illustrated arrangement is considered appropriate for a medium to large digester vessel. Since these elements and the related apparatus have been previously described in conjunction with FIG. 6 they will not be described again. However, the elements illustrated in FIG. 15 have been given the same numbers as are applied to the same elements in FIG. 6. It is to be understood that one or more of the draft tubes 70 and jet pumps 84,110 and 160 can be used in the vessel 220.

As shown in FIG. 15 the vertical draft tubes 70 are spaced to provide optimum pumping capability drawing from either the top or the bottom, depending upon whether the top jet pumps 110 or the bottom jet pumps 84 are activated. The system normally operates in three modes. Mode 1 activates the bottom jet pumps 84 on the draft tubes 70 to pump large quantities of material from the digester bottom and spread it over the top of the digester. Mode 2 activates the top jet pumps 110 to pump large quantities of material from the digester top portion downwardly through the draft tube and blasts it out over the bottom of the vessel. Mode 5 combines horizontal circulation mixing by jet pumps 160 located near the bottom with the downward pumpage of the draft tubes to mix settling materials with the main digester mass. In some designs, a set of the horizontal circulation jet pumps 160 may be provided for each draft tube mixer. The number of horizontal jet pumps and their placement within the digester depends upon the size and shape of each digester.

When this invention is utilized for anaerobic process management and mixing in the conventional American digester vessel shape, it provides effective mixing with vessel volume turn-over rates of 30 to 50 per day.

The foregoing detailed description has been given for clearness of understanding only, and no unnecessary limitations should be understood therefrom, as modifications will be obvious to those skilled in the art.

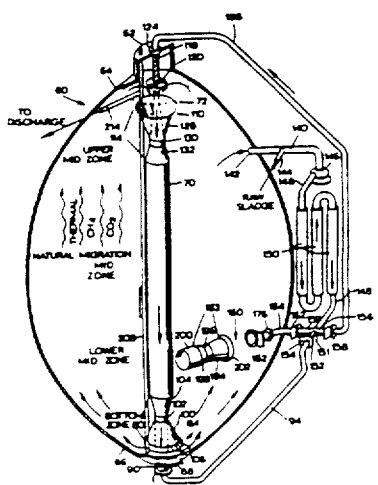

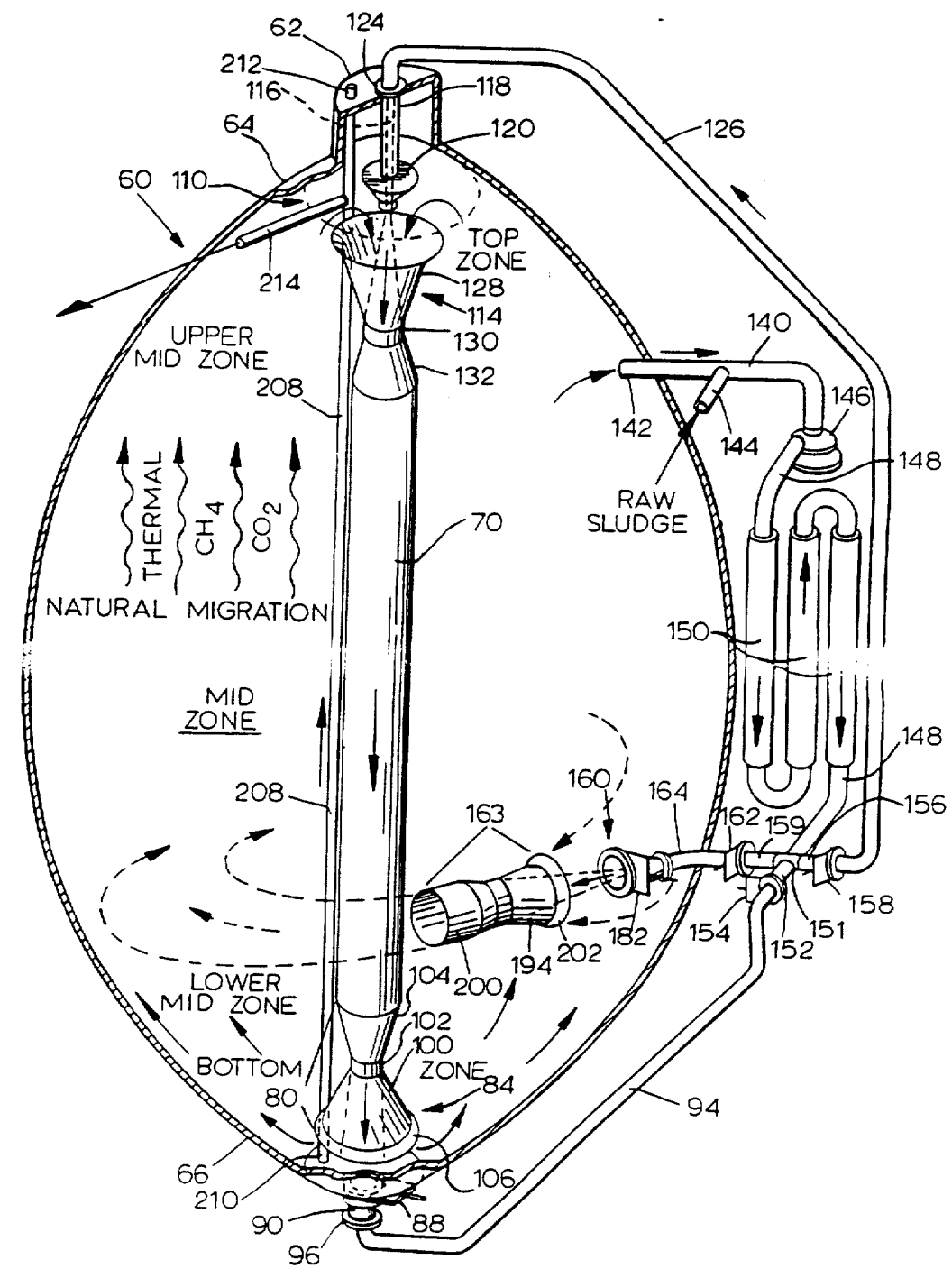

What is claimed is:

1. A method of anaerobically digesting sludge which comprises:
    filling an anaerobic sludge digestion vessel having a top and bottom and a substantially vertical draft tube with an upper end spaced downward of the vessel top and a lower end spaced upward of the vessel bottom, with liquid sludge to a level above the draft tube upper end;
    maintaining the vessel liquid sludge content at a temperature which is highly conducive to digestion of the sludge by anaerobic microorganisms;
    a venturi tube having an upper inlet means which is axially positioned in liquid communication with and forming part of the draft tube upper end; conduit means communicating with the vessel upper interior space above the venturi tube; and the conduit means having a jet nozzle located in the vessel and axially positioned above, and downwardly directed with respect to, the venturi tube; and
    feeding a pressurized stream of liquid sludge through the conduit means and out of the jet nozzle as a jet stream directed into the venturi tube thereby creating suction around the venturi tube inlet means and producing a pumping action which causes a stream of liquid sludge in the vessel upper space to flow into the inlet means and through the venturi tube, downwardly through the draft tube and out of the lower end of the draft tube thereby causing settled material on the vessel bottom to be dispersed into the vessel contents and also causing an upward circulating flow of liquid sludge in the vessel.

2. A method of anaerobically digesting sludge which comprises:

filling an anaerobic sludge digestion vessel with liquid sludge;

maintaining the vessel liquid sludge content at a temperature which is highly conducive to digestion of the sludge by anaerobic microorganisms;

a venturi tube having an inlet means being substantially horizontally positioned in the vessel and substantially tangential to a radius extending horizontally outward from the vessel vertical axis; conduit means communicating with the vessel interior space for supplying liquid sludge thereto; the conduit means communicating with a jet nozzle axially positioned relative to the venturi tube; and feeding a pressurized stream of liquid sludge through the conduit means and out of the jet nozzle as a jet stream directed into the venturi tube thereby creating suction around the venturi tube inlet means and producing a pumping action which causes a stream of liquid sludge in the vessel to flow into the venturi tube inlet means, through the venturi tube and outwardly thereof thereby causing circular rotation, dispersion and mixing of liquid sludge in the vessel.

3. A method of anaerobically digesting sludge which comprises:

filling an enclosed anaerobic sludge digestion vessel with liquid sludge;

the vessel being in the form of a shell having a substantially vertical axis and which is circular in horizontal section for most of its height; the vessel having a substantially wide middle portion and gradually decreasing in width from the middle portion to a top end and a bottom end; a substantially vertical draft tube being substantially axially positioned in the vessel and having an upper end spaced downwardly of the vessel top end and a lower end spaced upwardly of the vessel bottom end; a first venturi tube (80) having a lower inlet means and which is substantially axially positioned and in liquid sludge communication with and forming part of the lower end of the draft tube; first conduit means (94) communicating with the vessel bottom interior space beneath the venturi tube (80); and the first conduit means (94) having a jet nozzle (82) substantially axially positioned beneath, and upwardly directed with respect to, the first venturi tube (80);

maintaining the vessel liquid sludge content at a level near the draft tube upper end and at a temperature which is highly conducive to digestion of the sludge by anaerobic microorganisms;

feeding a pressurized stream of liquid sludge through the first conduit means (94) and out of the first jet nozzle (82) as a high velocity jet stream directed into the first venturi tube (80) thereby creating suction around the venturi tube inlet means and producing a pumping action which causes a stream of liquid sludge in the vessel bottom space to flow into the inlet means and through the first venturi tube (80) and upwardly through and out of the upper end of the draft tube to thoroughly admix and disperse with the pressurized sludge stream supplied by the jet nozzle (82) and also causing a downward circulating flow of liquid sludge in the vessel; and withdrawing partially anaerobically processed liquid sludge from the vessel and feeding it to the first conduit means (94).

4. A method according to claim 3 including:

feeding anaerobically unprocessed liquid sludge to the first conduit means (94).

5. A method according to claim 3 in which the step of maintaining the vessel liquid sludge content at a temperature which is highly conducive to digestion of the sludge by anaerobic microorganisms includes:

passing the withdrawn liquid sludge through a heat exchanger to regulate the sludge temperature before it is fed to the first conduit means (94).

6. A method of anaerobically digesting sludge which comprises:

filling an enclosed anaerobic sludge digestion vessel with liquid sludge;

the vessel being in the form of a shell having a substantially vertical axis and which is circular in horizontal section for most of its height; the vessel having a substantially wide middle portion and gradually decreasing in width from the middle portion to a top end and a bottom end; a substantially vertical draft tube being substantially axially positioned in the vessel and having an upper end spaced downwardly of the vessel top end and a lower end spaced upwardly of the vessel bottom end; a first venturi tube (80) having a lower inlet means and which is substantially axially positioned and in liquid sludge communication with and forming part of the lower end of the draft tube; first conduit means (94) communicating with the vessel bottom interior space beneath the venturi tube (80); and the first conduit means (94) having a jet nozzle (82) substantially axially positioned beneath, and upwardly directed with respect to, the first venturi tube (80);

maintaining the vessel liquid sludge content at a level near the draft tube upper end and at a temperature which is highly conducive to digestion of the sludge by anaerobic microorganisms; and feeding anaerobically unprocessed liquid sludge through a heat exchanger to regulate the sludge temperature and then feeding a pressurized stream of the liquid sludge through the first conduit means (94) and out of the first jet nozzle (82) as a high velocity jet stream directed into the first venturi tube (80) thereby creating suction around the venturi tube inlet means and producing a pumping action which causes a stream of liquid sludge in the vessel bottom space to flow into the inlet means and through the first venturi tube (80) and upwardly through and out of the upper end of the draft tube to thoroughly admix and disperse with the pressurized sludge stream supplied by the jet nozzle (82) and also causing a downward circulating flow of liquid sludge in the vessel.

7. A method of anaerobically digesting sludge which comprises:

filling an anaerobic sludge digestion vessel having a top and bottom and a substantially vertical draft tube with an upper end spaced downward of the vessel top and a lower end spaced upward of the vessel bottom, with liquid sludge to a level above the draft tube upper end;

maintaining the vessel liquid sludge content at a temperature which is highly conducive to digestion of the sludge by anaerobic microorganisms; and feeding a pressurized stream of liquid sludge through a first conduit to the inlet side of an upwardly directed jet nozzle operatively positioned and in communication with a substantially vertical venturi tube having a lower inlet means and forming part of the draft tube lower end to a lower pressure thereby creating suction at the venturi tube inlet means and producing a pumping action which causes a stream of liquid sludge in the vessel bottom space to flow into and upwardly in and out of the draft tube upper end and to impinge upon a slinger means which deflects the sludge outwardly in a circular pattern onto the surface of the digesting sludge in the vessel, and also causes the liquid sludge to thoroughly admix and disperse with the pressurized sludge stream supplied to the jet nozzle and also causes downward circulating flow of liquid sludge in the vessel.

8. A method of anaerobically. digesting sludge which comprises:

filling an enclosed anaerobic sludge digestion vessel with liquid sludge;

the vessel being in the form of a shell having a substantially vertical axis and which is circular in horizontal section for most of its height; the vessel having a substantially wide middle portion and gradually decreasing in width from the middle portion to a top end, and a bottom end; a substantially vertical draft tube being substantially axially positioned in the vessel and having an upper end spaced downwardly of the vessel top end and a lower end spaced upwardly of the vessel bottom end; a first venturi tube (80) having a lower inlet means: and which is substantially axially positioned and in liquid sludge communication with and forming part of the lower end of the draft tube; first conduit means (94) communicating with the vessel bottom interior space beneath the venturi tube (80); and the first conduit means (94) having a jet nozzle (82) substantially axially positioned beneath, and upwardly directed with respect to, the first venturi tube (80);

maintaining the vessel liquid sludge content at a level near the draft tube upper end and at a temperature which is highly conducive to digestion of the sludge by anaerobic microorganisms; and feeding a pressurized stream of liquid sludge through the first conduit means (94) and out of the first jet nozzle (82) as a high velocity jet stream directed into the first venturi tube (80) thereby creating suction around the venturi tube inlet means and producing a pumping action which causes a stream of liquid sludge in the vessel bottom space to flow into the inlet means and through the first venturi tube (80) and upwardly through and out of the upper end of the draft tube to impinge upon a slinger means which deflects the sludge outwardly in a circular pattern onto the surface of the digesting sludge in the vessel, and also causes the liquid sludge to thoroughly admix and disperse with the pressurized sludge stream supplied by the jet nozzle (82) and also causes a downward circulating flow of liquid sludge in the vessel.

9. A method of anaerobically digesting sludge which comprises:

filling an anaerobic sludge digestion vessel with liquid sludge, the vessel having a substantially flat bottom, a circular cylindrical side wall joined to the bottom and a top or roof joined to the side wall, and a substantially vertical draft tube with an upper end, spaced downward of the vessel top and a lower end spaced upward of the vessel bottom, with the vessel being filled with liquid sludge to a level above the draft tube upper end;

maintaining the vessel liquid sludge content at a temperature which is highly conducive to digestion of the sludge by anaerobic microorganisms;

feeding a pressurized stream of liquid sludge through a first conduit to the inlet side of an upwardly directed jet nozzle operatively positioned and in communication with a substantially vertical venturi tube having a lower inlet means and forming part of the draft tube lower end to a lower pressure thereby creating suction at the venturi tube inlet means and producing a pumping action which causes a stream of liquid sludge in the vessel bottom space to flow into and upwardly in and out of the draft tube upper end and to thoroughly admix and disperse with the pressurized sludge stream supplied to the jet nozzle and also causes downward circulating flow of liquid sludge in the vessel; and withdrawing partially anaerobically processed liquid sludge from the vessel and feeding it to the first conduit means.

10. A method of anaerobically digesting sludge which comprises: filling an anaerobic sludge digestion vessel with liquid sludge, the vessel having a substantially flat bottom, a circular cylindrical side wall joined to the bottom and a top or roof joined to the side wall, the vessel having a plurality of substantially vertical draft tubes with each tube having an upper and spaced downward of the vessel top and a lower end spaced upward of the vessel bottom, and each draft tube has associated therewith a venturi tube and a jet pump nozzle, communicating with a conduit with the vessel being filled with liquid sludge to a level above the upper ends of the draft tubes;

maintaining the vessel liquid sludge content at a temperature which is highly conducive to digestion of the sludge by anaerobic microorganisms;

feeding a pressurized stream of liquid sludge through each conduit and upwardly directed jet nozzle operatively positioned and in communication with the venturi robe which has a lower inlet means and forms part of the draft tube lower end to a lower pressure thereby creating suction at the venturi tube inlet means and producing a pumping action which causes a stream of liquid sludge in the vessel bottom space to flow into and upwardly in and out of the upper end of each draft tube to thoroughly admix and disperse with the pressurized sludge stream supplied to the jet nozzle and also causing downward circulating flow of liquid sludge in the vessel; and withdrawing partially anaerobically processed liquid sludge from the vessel and feeding it to at least some one of the conduits.

11. A method according to claim 9 or 10 including:

feeding anaerobically unprocessed liquid sludge to the first conduit means.

12. A method according to claim 9 or 10 in which the step of maintaining the vessel liquid sludge content at a temperature which is highly conducive to digestion of the sludge anaerobic microorganisms includes:

passing the liquid sludge through a heat exchanger to regulate the sludge temperature before it is fed to the first conduit means.

13. A method of anaerobically digesting sludge which comprises:

filling an anaerobic sludge digestion vessel with liquid sludge, the vessel having a substantially flat bottom, a circular cylindrical side wall joined to the bottom and a top or roof joined to the side wall, the vessel having a substantially vertical draft tube with an upper end spaced downward of the vessel top and a lower end spaced upward of the vessel bottom, with the vessel being filled with liquid sludge to a level above the draft tube upper end;

a first venturi tube (80) having a lower inlet means is substantially axially positioned in liquid communication with and forming part of the draft tube lower end; first conduit means (94) communicates with the vessel lower interior space below the first venturi tube (80) and the first conduit means (94) has a first jet nozzle (82) substantially axially positioned below, and upwardly directed with respect to, the first venturi tube (80);

a second venturi tube (114) having an upper inlet means is substantially axially positioned in liquid communication with and forming part of the draft tube upper end; second conduit means (116, 126) communicates with the vessel upper interior space above the venturi tube (114); and the second conduit means (116, 126) has a second jet nozzle (112) substantially axially positioned above, and downwardly directed with respect to, the second venturi tube (114);

maintaining the vessel liquid sludge content at a temperature which is highly conducive to digestion of the sludge by anaerobic microorganisms;

feeding a pressurized stream of liquid sludge through the first conduit means (94) to the inlet side of the first jet nozzle (82) operatively positioned and in communication with the substantially vertical first venturi tube (80) having a lower inlet means and forming part of the draft tube lower end to a lower pressure thereby creating suction at the first venturi tube inlet means and producing a pumping action which causes a stream of liquid sludge in the vessel bottom space to flow into and upwardly in and out of the draft tube upper end and to thoroughly admix and disperse with the pressurized sludge stream supplied to the first jet nozzle and also causing downward circulating flow of liquid sludge in the vessel; and inactivating the first jet nozzle (82) and feeding a pressurized stream of liquid sludge through the second conduit means (116, 126) and out of the second jet nozzle (112) as a jet stream directed into the second venturi tube (114) thereby creating suction around the venturi tube inlet means and producing a pumping action which causes a stream of liquid sludge in the vessel upper space to flow into the inlet means and through the second venturi tube (114), downwardly through the draft tube and out of the lower end of the draft tube thereby causing settled material on the vessel bottom to be dispersed into the vessel contents and also causing an upward circulating flow of liquid sludge in the vessel.

14. A method according to claim 13 in which a plurality of said draft tubes are positioned in the vessel and each draft tube has a said venturi tube and a said jet nozzle associated therewith, a said first conduit communicates with each jet pump nozzle, and liquid sludge is pumped upwardly through each draft tube.

15. A method according to claim 14 including:

withdrawing partially anaerobically processed liquid sludge from the vessel and feeding it to the second conduit means (116, 126).

16. (Once rewritten) A method according to claim 13 including:

withdrawing partially anaerobically processed liquid sludge from the vessel and feeding it to the second conduit means (116, 126).

17. A method of anaerobically digesting sludge which comprises:

filling an anaerobic sludge digestion vessel with liquid sludge, the vessel having a substantially flat bottom, a circular cylindrical side wall joined to the bottom and a top or roof joined to the side wall, the vessel having a substantially vertical draft tube with an upper end spaced downward of the vessel top and a lower end spaced upward of the vessel bottom, with the vessel being filled with liquid sludge to a level substantially above the draft tube upper end;

a first venturi tube (80) having a lower inlet means is substantially axially positioned in liquid communication with and forming part of the draft tube lower end; first conduit means (94) communicates with the vessel lower interior space below the first venturi tube (80) and the first conduit means (94) has a first jet nozzle (82) substantially axially positioned below, and upwardly directed with respect to, the first venturi tube (80);

a second venturi tube (163) having an inlet means is substantially horizontally positioned in the vessel substantially normal to a radius extending horizontally outward from the vessel vertical axis; a second conduit means (164) communicates with the vessel interior space for supplying liquid sludge thereto; and the second conduit means (164) has a second jet nozzle (161) substantially axially positioned relative to the second venturi tube (163);

maintaining the vessel liquid sludge content at a temperature which is highly conducive to digestion of the sludge by anaerobic microorganisms;

feeding a pressurized stream of liquid sludge through the first conduit means (94) to the inlet side of the upwardly directed first jet nozzle (82) operatively positioned and in communication with the substantially vertical first venturi tube (80) having a lower inlet means and forming part of the draft tube lower end to a lower pressure thereby creating suction at the first venturi tube (80) inlet means and producing a pumping action which causes a stream of liquid sludge in the vessel bottom space to flow into and upwardly in and out of the draft tube upper end and to thoroughly admix and disperse with the pressurized sludge stream supplied to the first jet nozzle (82) and also causing downward circulating flow of liquid sludge in the vessel; and feeding a pressurized stream of liquid sludge through the second conduit means (164) and out of the second jet nozzle (161) as a jet stream directed into the second venturi tube (163) thereby creating suction around the venturi tube (163) inlet means and producing a pumping action which causes a stream of liquid sludge in the vessel to flow into the second venturi tube (163) inlet means, through the second venturi tube (163) and outwardly therefrom thereby causing circular rotation, dispersion and mixing of liquid sludge in the vessel.

18. A method of anaerobically digesting sludge which comprises:

filling an enclosed anaerobic sludge digestion vessel with liquid sludge;

the vessel being in the form of a shell having a substantially vertical axis and which is circular in horizontal section for most of its height; the vessel having a substantially wide middle portion and gradually decreasing in width from the middle portion to a top end and a bottom end; a substantially vertical draft tube being substantially axially positioned in the vessel and having an upper and spaced downwardly of the vessel top end and a lower end spaced upwardly of the vessel bottom end; a first venturi tube (80) having a lower inlet means and which is axially positioned and in liquid sludge communication with and forming part of the lower end of the draft tube; first conduit means (94) communicating with the vessel bottom interior space beneath the venturi tube (80); and, the first conduit means (94) having a jet nozzle (82) axially positioned beneath, and upwardly directed with respect to, the first venturi tube (80); a second venturi tube (114) having an upper inlet means axially positioned in liquid communication with and forming part of the draft tube upper end; second conduit means (116, 126) communicates with the vessel upper interior space above the second venturi tube (114); and the second conduit means (116, 126) has a second jet nozzle 112 axially positioned above, and downwardly directed with respect to, the second venturi tube (114);

maintaining the vessel liquid sludge content at a level near the draft tube upper end and at a temperature which is highly conducive to digestion of the sludge by anaerobic microorganisms;

feeding a pressurized stream of liquid sludge through the first conduit means (94) and out or the first jet nozzle (82) as a high velocity jet stream directed into the first venturi tube (80) thereby creating suction around the venturi tube inlet means and producing a pumping action which causes a stream of liquid sludge in the vessel bottom space to flow into the inlet means and through the first venturi tube (80) and upwardly through and out of the upper end of the draft tube to thoroughly admix and disperse with the pressurized sludge stream supplied by the jet nozzle (82) and also causing a downward circulating flow of liquid sludge in the vessel; and inactivating the first jet nozzle and feeding a pressurized stream of liquid sludge through the second conduit means (116, 126) and out of the second jet nozzle (112) as a jet stream directed into the second venturi tube (114) thereby creating suction around the venturi tube (114) inlet means and producing a pumping action which causes a stream of liquid sludge in the vessel upper space to flow into the inlet means and through the second venturi tube (114), downwardly through the draft robe and out of the lower end of the draft tube thereby causing settled material on the vessel bottom to be dispersed into the vessel contents and also causing an upward circulating flow of liquid sludge in the vessel.

19. A method according to claim 18 including:

withdrawing partially anaerobically processed liquid sludge from the vessel and feeding it to the second conduit means (164).

20. A method according to claim 18 including:

feeding anaerobically unprocessed liquid sludge to the second conduit means (164).

21. A method according to claim 18 in which the step of maintaining the vessel liquid sludge content at a temperature which is highly conducive to digestion of the sludge by anaerobic microorganisms includes:

passing the liquid sludge through a heat exchanger to regulate the sludge temperature before it is fed to the second conduit means (164).

22. A method according to claim 18 in which:

a third venturi tube (163) having an inlet means is substantially horizontally positioned in the vessel substantially normal to a radius extending substantially horizontally outward from the vessel vertical axis; a third conduit means (144, 140, 148, 159, 164) communicates with the vessel interior space for supplying liquid sludge thereto; and the third conduit means (144, 140, 148, 159, 164) has a third jet nozzle (161) axially positioned relative to the third venturi tube (163); and a pressurized stream of liquid sludge is fed through the third conduit means (144, 140, 148, 159, 164) and out of the third jet nozzle (161) as a jet stream directed into the third venturi tube (163) thereby creating suction around the third venturi tube inlet means and producing a pumping action which causes a stream of liquid sludge in the vessel to flow into the third venturi tube (163) inlet means, through the third venturi tube (163) and outwardly therefrom thereby causing circular rotation, dispersion and mixing of liquid sludge in the vessel.

23. A method according to claim 22 including:

withdrawing partially anaerobically processed liquid sludge from the vessel and feeding it to the third conduit means (144, 140, 148, 159, 164).

24. A method according to claim 22 including:

feeding anaerobically unprocessed liquid sludge to the third conduit means (144, 140, 148, 159, 164).

25. A method according to claim 22 in which the step of maintaining the vessel liquid sludge content at a temperature which is highly conducive to digestion of the sludge by anaerobic microorganisms includes:

passing the liquid sludge through a heat exchanger to regulate the sludge temperature before it is fed to the third conduit means (144, 140, 148, 159, 164).

26. A method of anaerobically digesting sludge which comprises:

filling an enclosed anaerobic sludge digestion vessel with liquid sludge;

the vessel being in the form of a shell having a substantially vertical axis and which is circular in horizontal section for most of its height; the vessel having a substantially wide middle portion and gradually decreasing in width from the middle portion to a top end and a bottom end; a substantially vertical draft tube being substantially axially positioned in the vessel and having an upper end spaced downwardly of the vessel top end and a lower end spaced upwardly of the vessel bottom end; a first venturi tube (80) having a lower inlet means and which is substantially axially positioned and in liquid sludge communication with and forming part of the lower end of the draft tube; first conduit means (94) communicating with the vessel bottom interior space beneath the venturi tube (80); and the first conduit means (94) having a jet nozzle (82) substantially axially positioned beneath, and upwardly directed with respect to, the first venturi tube (80);

a second venturi tube (163) having an inlet means and which is substantially horizontally positioned in the vessel substantially normal to a radius extending substantially horizontally outward from the vessel vertical axis; a second conduit means (144, 140, 148, 159, 164) communicates with the vessel interior space for supplying liquid sludge thereto; and the second conduit means (144, 140, 148, 159, 164) has a second jet nozzle (161) axially positioned relative to the second venturi tube (163);

maintaining the vessel liquid sludge content at a level near the draft tube upper end and at a temperature which is highly conducive to digestion of the sludge by anaerobic microorganisms;

feeding a pressurized stream of liquid sludge through the first conduit means (94) and out of the first jet nozzle (82) as a high velocity jet stream directed into the first venturi tube (80) thereby creating suction around the venturi tube inlet means and producing a pumping action which causes a stream of liquid sludge in the vessel bottom space to flow into the inlet means and through the first venturi tube (80) and upwardly through and out of the upper end of the draft tube to thoroughly admix and disperse with the pressurized sludge stream supplied by the first jet nozzle (82) and also causing a downward circulating flow of liquid sludge in the vessel; and feeding a pressurized stream of liquid sludge through the second conduit means (144, 140, 148, 159, 164) and out of the second jet nozzle (161) as a jet stream directed into the second venturi tube (163) thereby creating suction around the second venturi tube inlet means and producing a pumping action which causes a stream of liquid sludge in the vessel to flow into the second venturi tube (163) inlet means, through the second venturi tube (163) and outwardly therefrom thereby causing circular rotation, dispersion and mixing of liquid sludge in the vessel.

27. A method according to claim 26 including:
withdrawing partially anaerobically processed liquid sludge from the vessel and feeding it to the second conduit means (144, 140, 148, 159, 164).

28. A method according to claim 26 including:
feeding anaerobically unprocessed liquid sludge the second conduit means (144, 140, 148, 159, 164).

29. A method according to claim 26 in which the step of maintaining the vessel liquid sludge content at a temperature which is highly conducive to digestion of the sludge by anaerobic microorganisms includes:

passing the liquid sludge through a heat exchanger to regulate the sludge temperature before it is fed to the second conduit means (144, 140, 148, 159, 164).

30. A method of anaerobically digesting sludge which comprises:
filling an anaerobic sludge digestion vessel having a top and bottom and a substantially vertical draft tube with an upper end spaced downward of the vessel top and a lower end spaced upward of the vessel bottom, with liquid sludge to a level substantially above the draft tube upper end;

a first venturi tube (80) having a lower inlet means is axially positioned in liquid communication with and forming part of the draft tube lower end; first conduit means (94) communicates with the vessel lower interior space below the first venturi tube (80) and the first conduit means (94) has a first jet nozzle (82) axially positioned below, and upwardly directed with respect to, the first venturi tube (80);

a second conduit means (144, 140, 148, 159, 164) communicates with the vessel interior space for supplying liquid sludge thereto;

the second conduit means (144, 140, 148, 159, 164) having a second jet nozzle (161) substantially horizontally positioned and substantially normal to a radius extending horizontally outward from the vessel vertical axis;

maintaining the vessel liquid sludge content at a temperature which is highly conducive to digestion of the sludge by anaerobic microorganisms;

feeding a pressurized stream of liquid sludge through the first conduit means (80) to the inlet side of the upwardly directed first jet nozzle (82) operatively positioned and in communication with a substantially vertical venturi tube (80) having a lower inlet means and forming part of the draft tube lower end to a lower pressure thereby creating suction at the first venturi tube (80) inlet means and producing a pumping action which causes a stream of liquid sludge in the vessel bottom space to flow into, and upwardly in and out of the draft tube upper end and to thoroughly admix and disperse with the pressurized sludge stream supplied to the jet nozzle and also causing downward circulating flow of liquid sludge in the vessel; and feeding a pressurized stream of liquid sludge through the second conduit means (144, 140, 148, 159, 164) and out of the second jet nozzle (161) as a jet stream.

31. A method according to claim 30 including withdrawing partially anaerobically digested liquid sludge from the vessel and feeding it to the second conduit means (144, 140, 148, 159, 164).

32. A method according to claim 30 including:
feeding anaerobically unprocessed liquid sludge to the second conduit means (144, 140, 148, 159., 164).

33. A method of anaerobically digesting sludge which comprises:
filling an enclosed anaerobic sludge digestion vessel with liquid sludge;

the vessel being in the form of a shell having a substantially vertical axis and which is circular in horizontal section for most of its height; the vessel having a substantially wide middle portion and gradually decreasing in width from the middle portion to a top end and a bottom end; a substantially vertical draft tube being substantially axially positioned in the vessel and having an upper end spaced downwardly of the vessel top end and a lower end spaced upwardly of the vessel bottom end; a venturi tube having inlet means and which is axially positioned and in liquid sludge communication with and forming part of the lower end of the draft tube; conduit means communicating with the vessel bottom interior space beneath the venturi tube; and the conduit means having a jet nozzle axially positioned beneath, and upwardly directed with respect to the venturi tube;

maintaining the vessel liquid sludge content at a level near the draft tube upper end and at a temperature which is highly conducive to digestion of the sludge by anaerobic microorganisms;

withdrawing partially anaerobically processed liquid sludge from an upper mid-zone of the vessel and feeding it under pressure to the conduit means and out of the jet nozzle as a high velocity jet stream directed into the venturi tube thereby creating suction around the venturi tube inlet means and producing a pumping action which causes a stream of liquid sludge in the vessel bottom space to flow into the inlet means and through the venturi tube and upwardly through and out of the upper end of the draft tube to thoroughly mix and disperse with the pressurized sludge stream supplied by the jet nozzle and also causing a downward circulating flow of liquid sludge in the vessel.

* * * * *

UNITED STATES PATENT AND TRADEMARK OFFICE
CERTIFICATE OF CORRECTION

PATENT NO. : 5,409,610

DATED : April 25, 1995

INVENTOR(S) : Sidney E. Clark

It is certified that error appears in the above-identified patent and that said Letters Patent is hereby corrected as shown below:

The Title page should be deleted to appear as per attached Title page.

Fig. 6, the three-way cross-fitting designated by reference numeral 150, and located between features having reference numerals 148, 152, 156, and 159 should be designated by 151 rather than 150.

Fig. 10, the three-way cross-fitting designated by reference numeral 150, and located between features having reference numerals 148, 152, 156, and 159 should be designated by 151 rather than 150.

Fig. 11, the three-way cross-fitting designated by reference numeral 150, and located between features having reference numerals 148, 152, 156, and 159 should be designated by 151 rather than 150. (See attached sheets for drawing changes).

Col. 3, line 3, change "TEE" to --THE--.

Col. 5, line 9, change "a a top" to --a top--.

Col. 6, line 11, change "means-having" to --means having--.

UNITED STATES PATENT AND TRADEMARK OFFICE
CERTIFICATE OF CORRECTION

PATENT NO. : 5,409,610

DATED : Apr. 25, 1995

INVENTOR(S) : Sidney E. Clark

It is certified that error appears in the above-indentified patent and that said Letters Patent is hereby corrected as shown below:

Col. 6, line 15, change "stream -directed" to --stream directed--.

Col. 10, line 21, change "150" to --151--.

Col. 10, line 23, change "150" to --151--.

Col. 10, line 25, change "150" to --151--.

Col. 15, line 7, change "this-mode" to --this mode--.

Col. 15, line 21, change "1180" to --180--.

Col. 15, line 30, change "1180" to --180--.

Col. 15, line 32, change "1180" to --180--.

Col. 15, line 42, change "1180" to --180--.

Col. 15, line 44, change "1180" to --180--.

Col. 15, line 46, change "1180" to --180--.

Signed and Sealed this

Tenth Day of October, 1995

*Attest:*

BRUCE LEHMAN

*Attesting Officer*  *Commissioner of Patents and Trademarks*

United States Patent [19]

Clark

[11] Patent Number: 5,409,610
[45] Date of Patent: Apr. 25, 1995

[54] METHOD FOR ANAEROBIC SLUDGE DIGESTION

[76] Inventor: Sidney E. Clark, 305 Blue Ridge Pkwy., Madison, Wis. 53705

[21] Appl. No.: 970,548

[22] Filed: Nov. 2, 1992

Related U.S. Application Data

[63] Continuation of Ser. No. 668,953, Mar. 13, 1991, abandoned.

[51] Int. Cl.$^6$ ............................................. C02F 11/04
[52] U.S. Cl. ................................. 210/603; 210/613; 210/179; 210/180
[58] Field of Search ............... 210/603, 613, 629, 630, 210/179, 180, 194, 196, 197, 512.1

[56] References Cited

U.S. PATENT DOCUMENTS

| | | | |
|---|---|---|---|
| 1,722,945 | 7/1929 | Prüss | 210/2 |
| 2,043,119 | 6/1936 | Prüss | 210/2 |
| 2,605,220 | 7/1952 | Logan | 210/2 |
| 2,680,602 | 6/1954 | Nelson et al. | 259/97 |
| 3,055,502 | 9/1962 | Cunetta | 210/197 |
| 3,194,756 | 7/1965 | Walker | 210/197 |
| 3,338,826 | 8/1967 | Kramer | 210/613 |
| 3,371,618 | 3/1968 | Chambers | 103/258 |
| 3,373,688 | 3/1968 | Howard | 103/3 |
| 3,400,047 | 9/1968 | Howard | 176/56 |
| 3,625,820 | 12/1971 | Gluntz | 176/54 |
| 4,092,338 | 5/1978 | Tossey | 210/603 |
| 4,111,808 | 9/1978 | Fair | 210/197 |
| 4,207,180 | 6/1980 | Chang | 210/180 |
| 4,482,458 | 11/1984 | Rovel et al. | 210/603 |
| 4,586,825 | 5/1986 | Hayatdavoudi | 366/137 |
| 4,847,043 | 7/1989 | Gluntz | 376/372 |
| 4,879,087 | 11/1989 | Akiyama et al. | 376/216 |
| 4,954,257 | 9/1990 | Vogelpohl et al. | 210/629 |
| 4,981,366 | 1/1991 | Wickoren | 210/197 |

OTHER PUBLICATIONS

"Entrainment In Turbulent Fluid Jets" Donald and Singer; Trans. Instn. Chem. Engrs., vol. 37, 1959.
Egg-Shaped Digesters; From Germany to the United States, J. R. Stukenberg et al; 63rd Annual Conference Water Pollution Control Federation, Washington, D.C., Oct. 7-11, 1990.
Mixing in Egg-Shaped Anaerobic Digesters, J. P. Garvin and R. E. Hills.

*Primary Examiner*—Thomas Wyse
*Attorney, Agent, or Firm*—Marshall, O'Toole, Gerstein, Murray & Borun

[57] ABSTRACT

Method and apparatus for anaerobically digesting sludge by filling an anaerobic sludge digestion vessel having a top and bottom and a substantially vertical draft tube with an upper end spaced downward of the vessel top and a lower end spaced upward of the vessel bottom, with liquid sludge to a level substantially above the draft tube upper end; feeding a pressurized stream of liquid sludge to the inlet side of an upwardly directed jet nozzle operatively positioned and in communication with a substantially vertical venturi tube having a lower inlet and forming part of the draft tube lower end to a lower pressure thereby creating suction at the venturi tube inlet and producing a pumping action which causes a stream of liquid sludge in the vessel bottom space to flow into and upwardly in and out of the draft tube upper end and to thoroughly admix and disperse with the pressurized sludge stream supplied to the jet nozzle and also causing downward circulating flow of liquid sludge in the vessel. Additional sludge mixing can be achieved by placing a similar jet nozzle and venturi tube at the top of the vessel to produce a downward mixing flow of sludge in the draft tube. Also, such a jet pump can be mounted substantially tangentially of the vessel wall to produce helical mixing of the sludge in the vessel. The driving liquid fed to the jet nozzle can be partially digested sludge withdrawn from the vessel, raw sludge or a mixture thereof.

33 Claims, 10 Drawing Sheets